Sept. 9, 1969    F. H. W. SCHOENWITZ    3,466,605
ALARM PRINTER
Filed Nov. 28, 1967    14 Sheets-Sheet 1

INVENTOR.
FRANK H. SCHOENWITZ
BY
ATTORNEY.

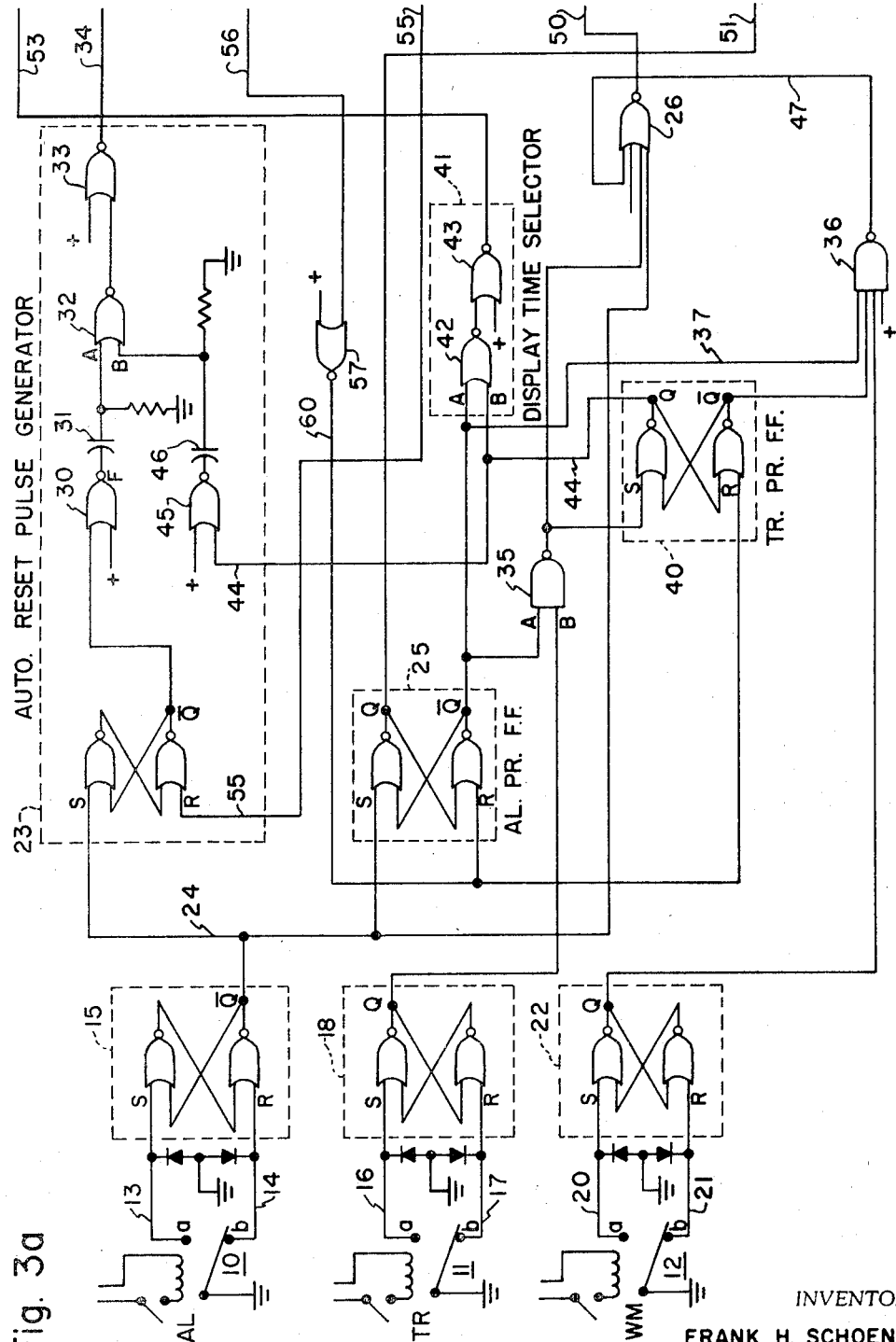

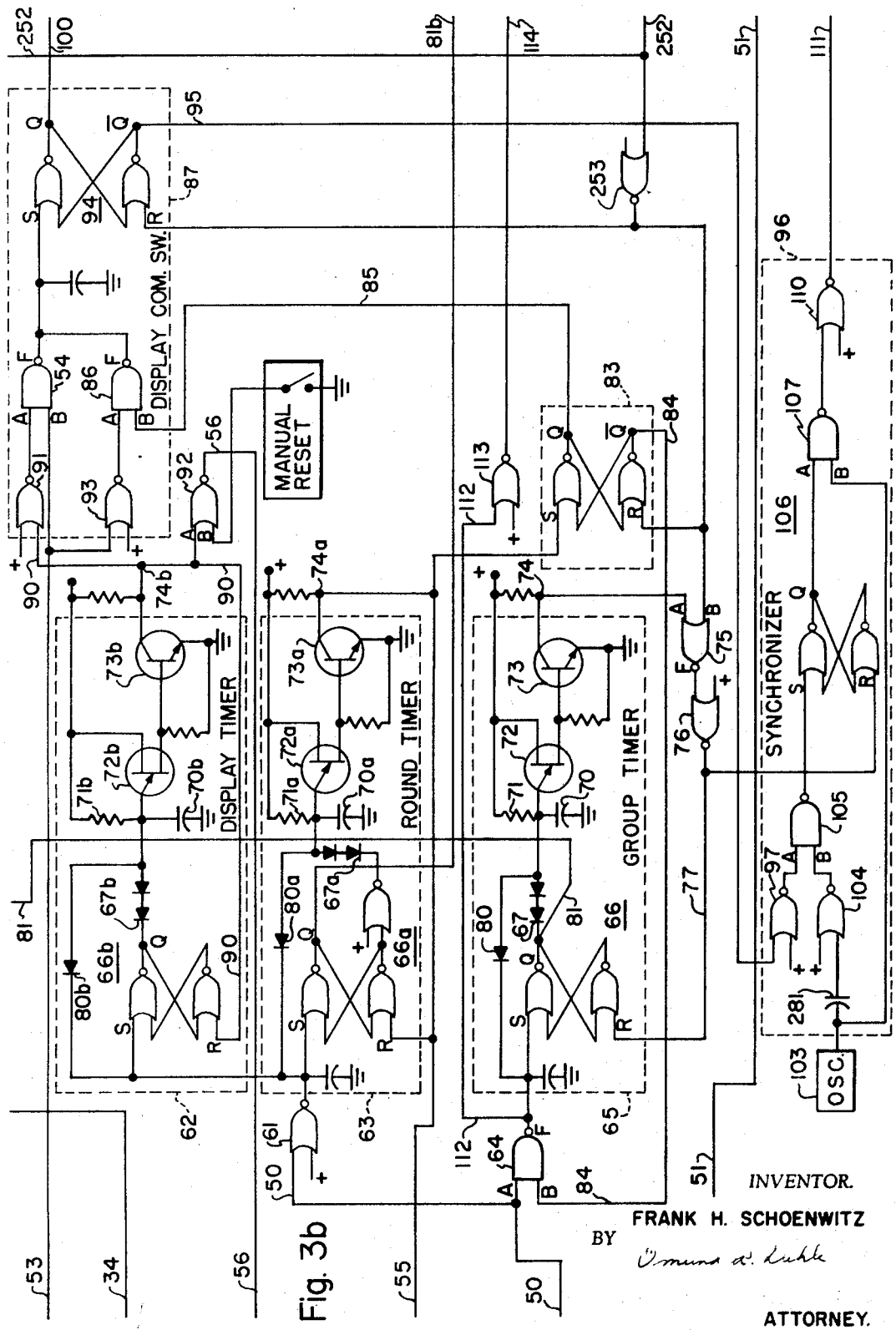
Sept. 9, 1969   F. H. W. SCHOENWITZ   3,466,605
ALARM PRINTER
Filed Nov. 28, 1967   14 Sheets-Sheet 4
INVENTOR.
FRANK H. SCHOENWITZ
BY
ATTORNEY.

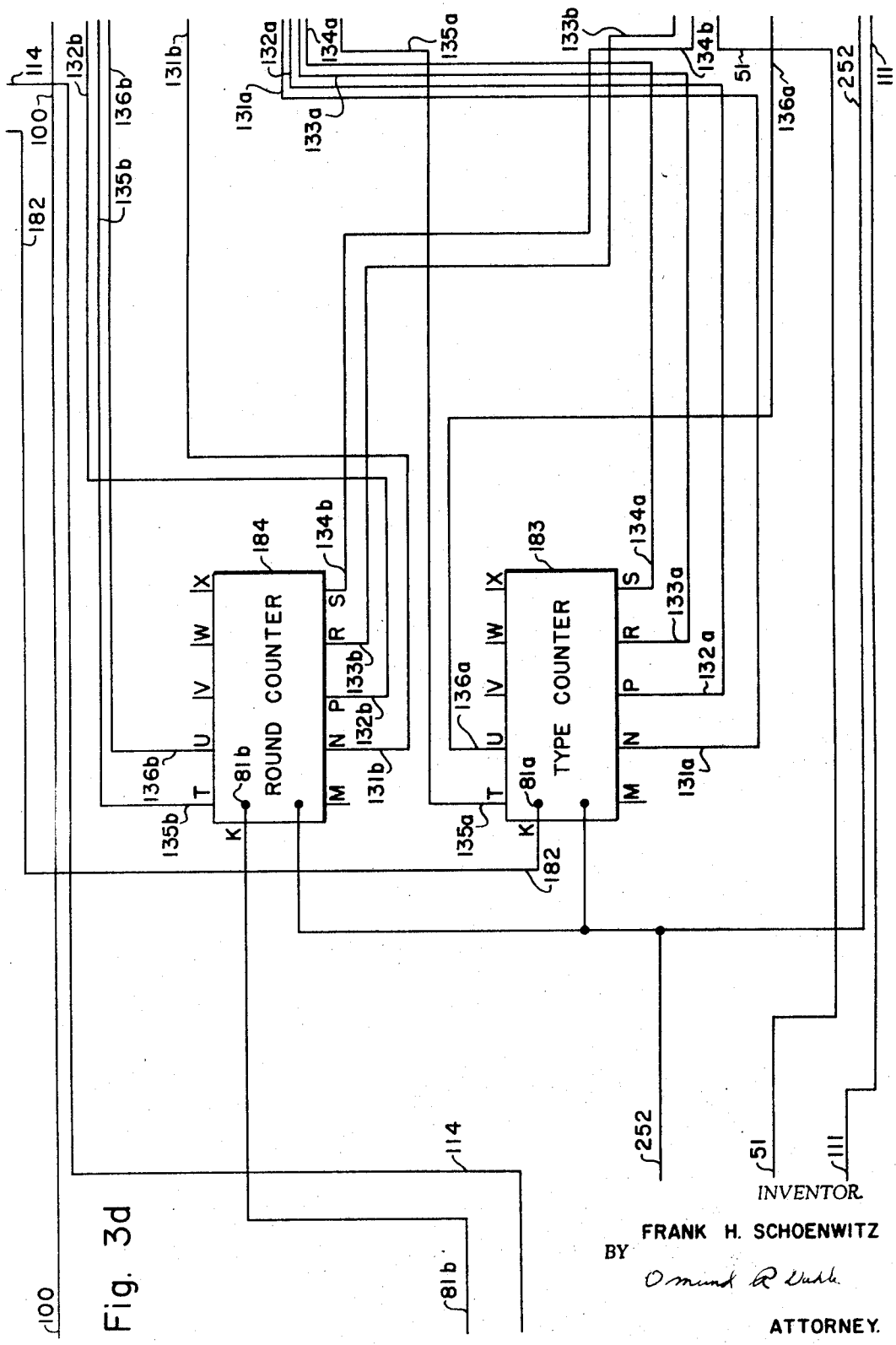

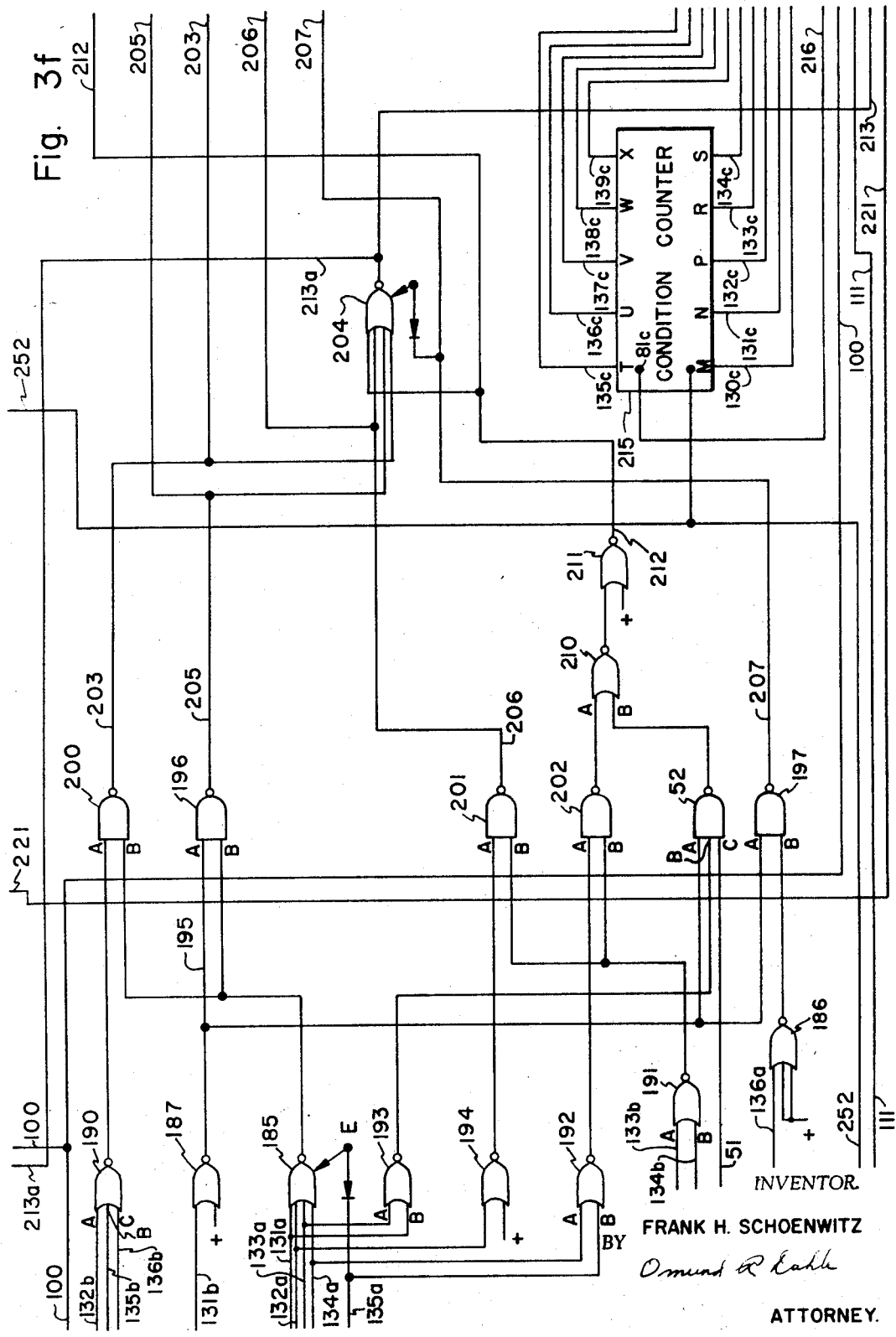

INVENTOR.
FRANK H. SCHOENWITZ
BY Osmund R Dahle
ATTORNEY.

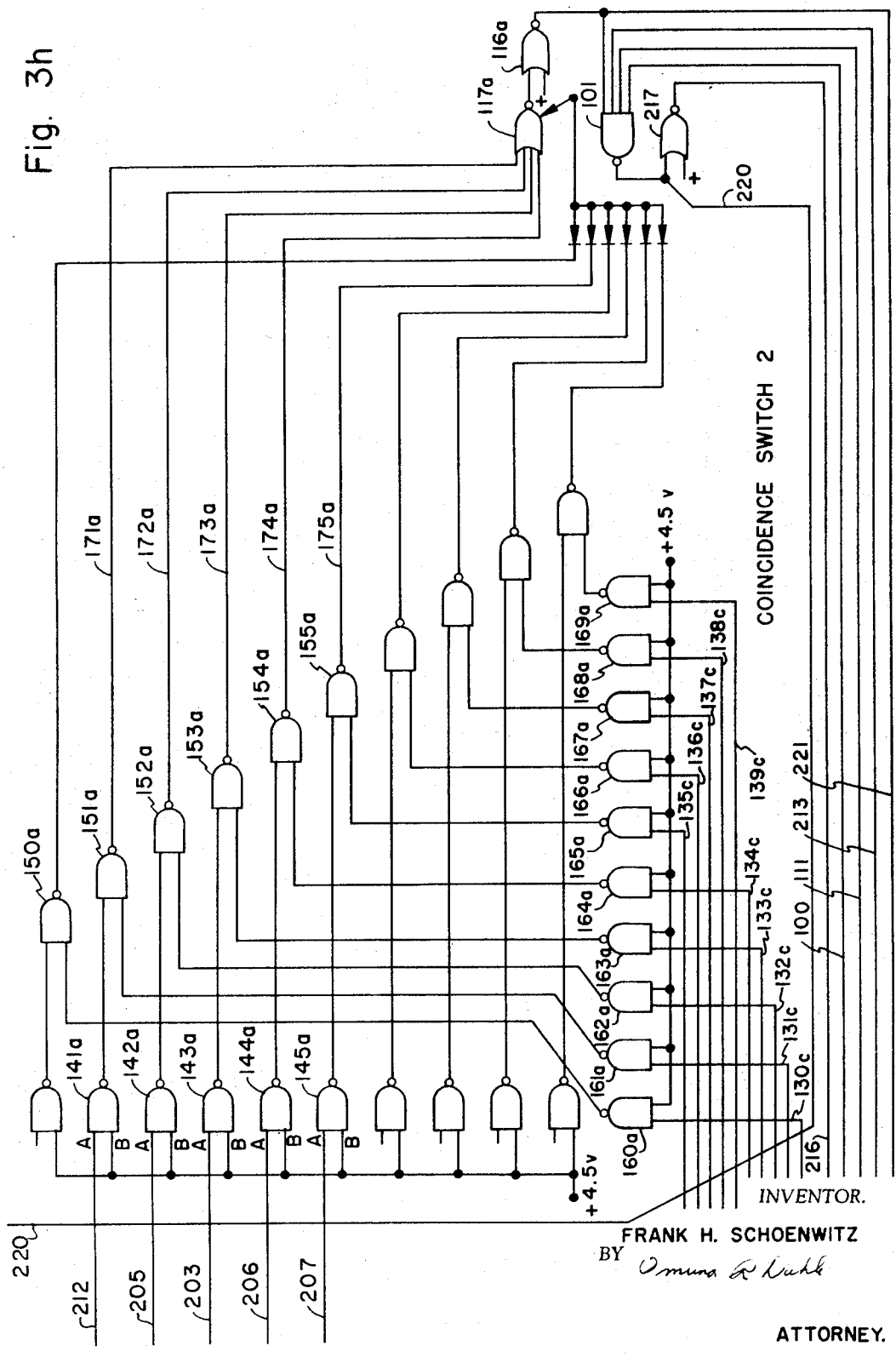

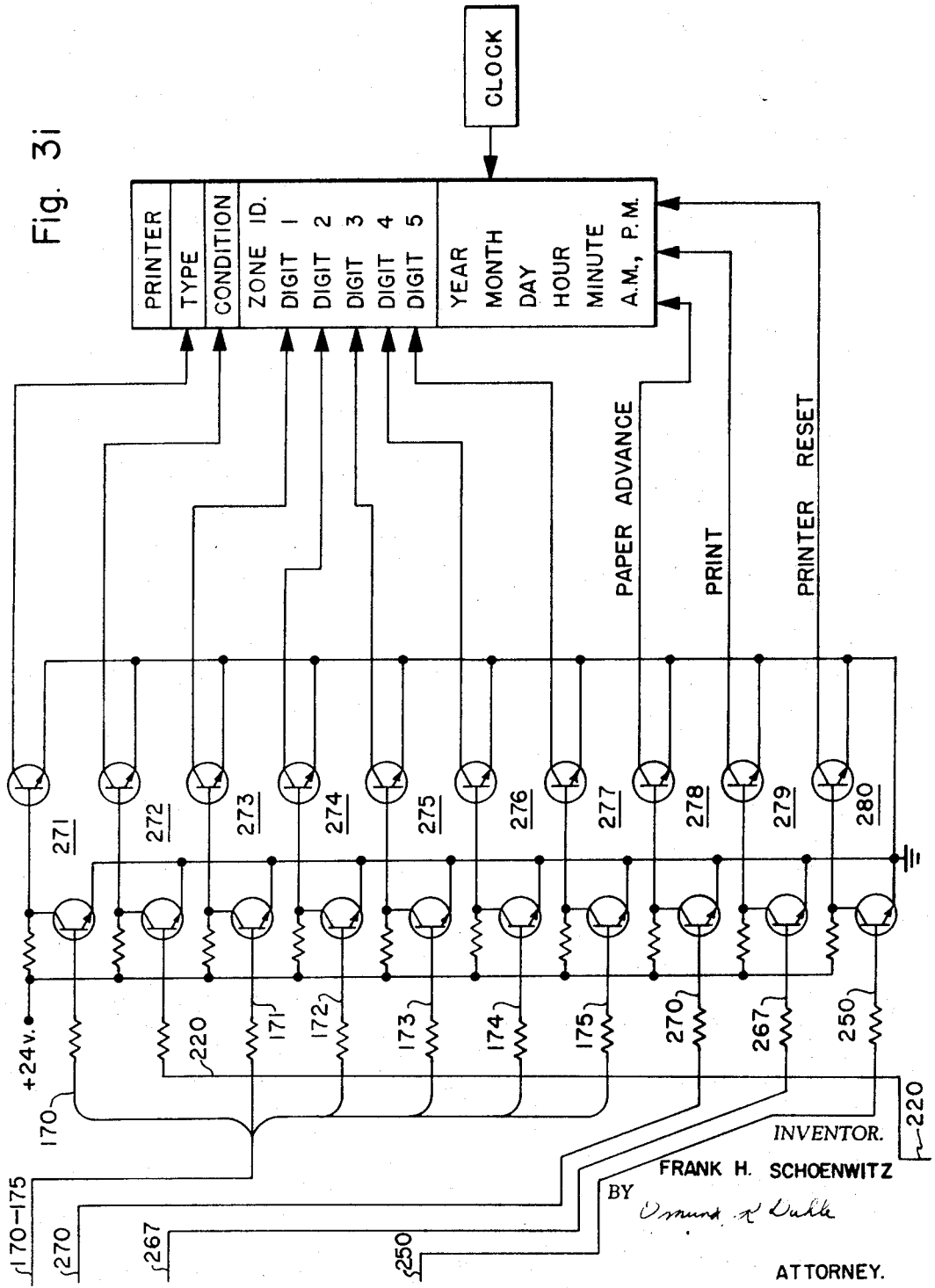

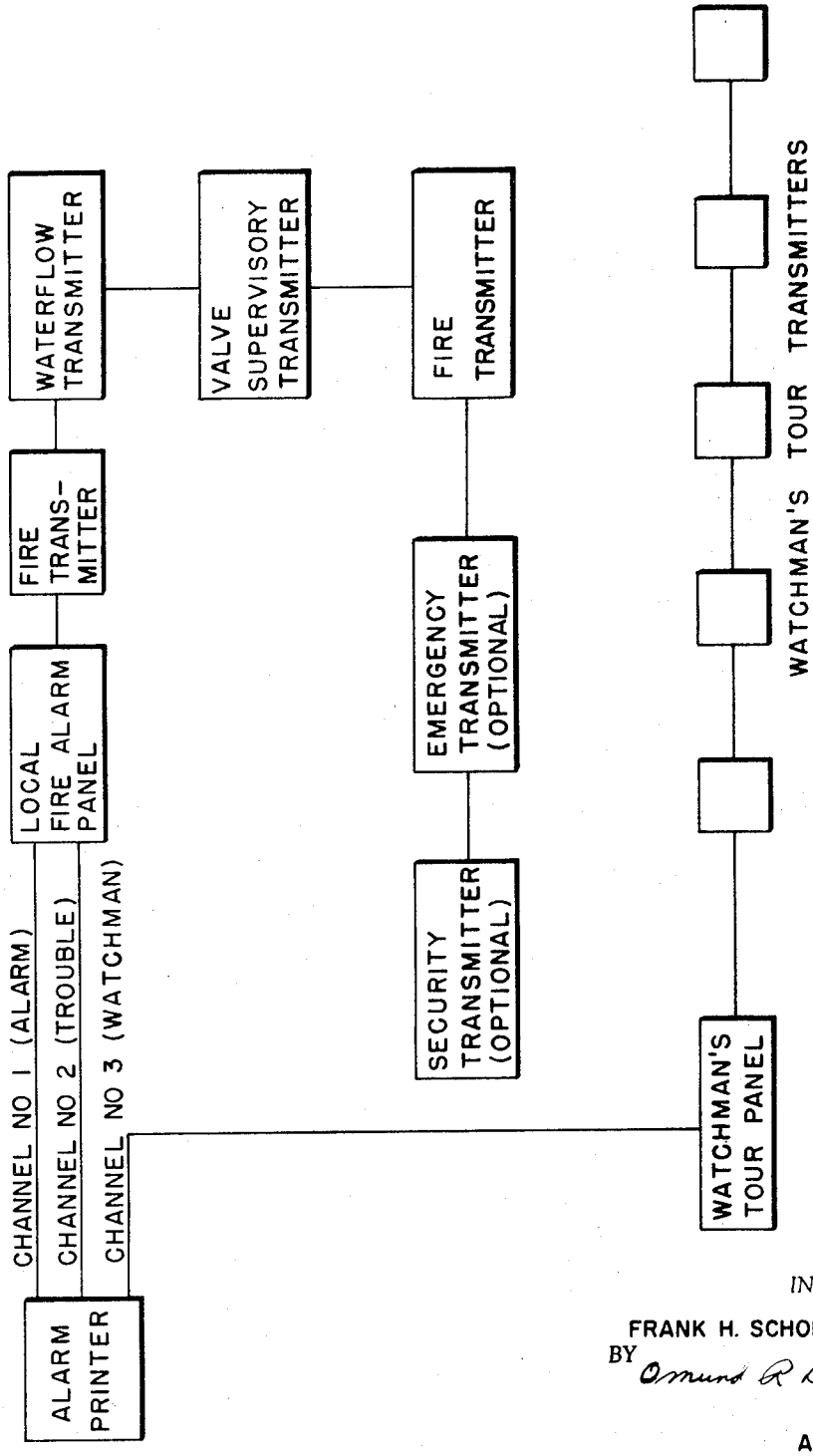

Sept. 9, 1969  F. H. W. SCHOENWITZ  3,466,605
ALARM PRINTER
Filed Nov. 28, 1967  14 Sheets-Sheet 13
Fig. 9
Fig. 5a
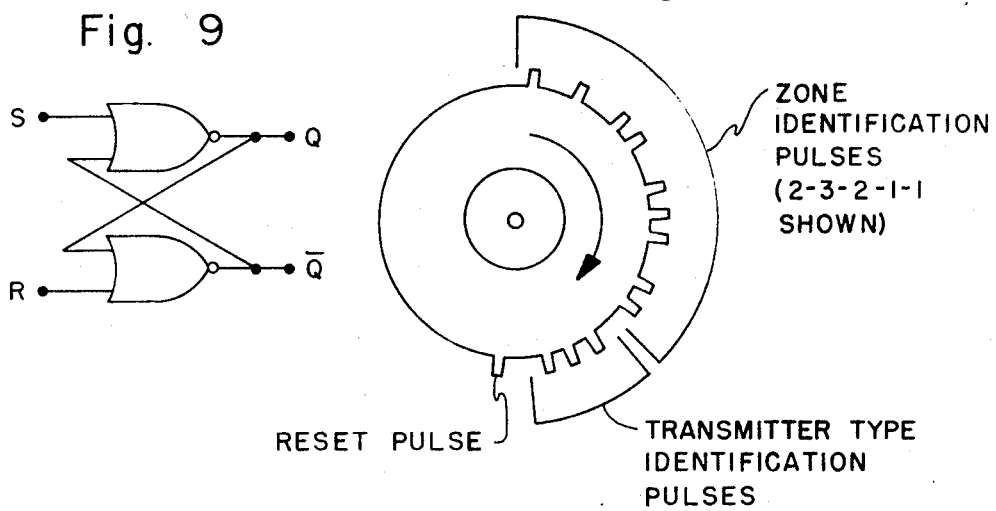
Fig. 5b
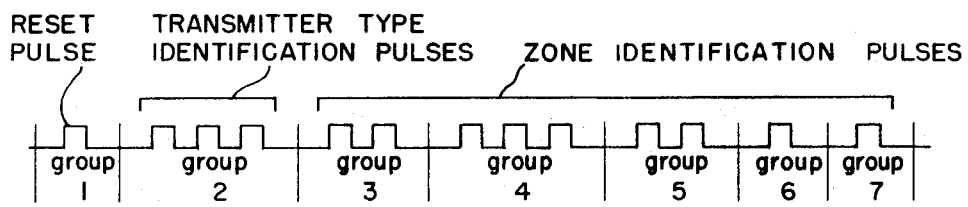
Fig. 5c
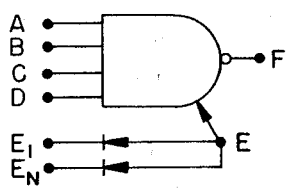
Fig. 8
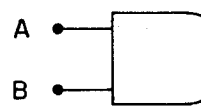
Fig. 6  Fig. 7
INVENTOR.
FRANK H. SCHOENWITZ
BY Osmund R. Dalle
ATTORNEY.

Sept. 9, 1969  F. H. W. SCHOENWITZ  3,466,605
ALARM PRINTER
Filed Nov. 28, 1967  14 Sheets-Sheet 14

INVENTOR.
FRANK H. SCHOENWITZ
BY
ATTORNEY.

United States Patent Office 3,466,605
Patented Sept. 9, 1969

3,466,605
ALARM PRINTER
Frank H. W. Schoenwitz, Arlington Heights, Ill., assignor to Honeywell Inc., Minneapolis, Minn., a corporation of Delaware
Filed Nov. 28, 1967, Ser. No. 686,079
Int. Cl. H04q 1/20
U.S. Cl. 340—151            11 Claims

ABSTRACT OF THE DISCLOSURE

An alarm printer to be used with local, proprietary, and remote fire alarm and security systems. The alarm printer receives pulse coded serial information from electro-mechanical transmitters on three channels of differing priority. The alarm printer electronically decodes the pulse coded information and prints it in clear written form. The contents of the printout shows the transmitter type (fire, waterflow, security, etc.) of an event, the condition of the event (alarm, trouble, restoration, etc.) the zone identification code, the time and the date when the information is received and printed. Three isolated contacts, an alarm contact, a trouble contact and a watchman contact deliver the coded pulses to the alarm printer. The input signals from these three channels pass through a priority detector to be decoded; and if more than one channel is receiving data, only the one of highest priority is accepted for decoding and printing. Solid state circuitry decodes the pulses and this information, taken together with the number of "rounds," is utilized to set up the print wheels and print out the proper information.

BACKGROUND OF THE INVENTION

The field of the invention is alarm printers. Transmitting many signals over a minimum number of wires allows great wiring economies. In the electrical protection industry this is most commonly accomplished with coded transmitters and receivers which send electrical pulses from one location to another. Interpreting these pulses has always been a problem. An important consideration in any protection system is to provide a means of recording system operation. Coded proprietary and local alarm systems as well as watchman's tour systems require a means of receiving and recording all coded signals coming into the local fire alarm panel. These signals are received in the form of electrical pulse codes and recorded with the alarm printer for permanent record.

There are alarm recorders in the art which cut holes in paper and thus use a punch-tape type of recording. This provides a permanent record, but it must be translated by human means to determine the information. Alarm, trouble, and restoration signals received must be distinguished by the number of rounds of coded signals which must be read from the punched tape. Attempts have been made in the past to improve upon this type of recording and an example is shown in the U.S. Patent 2,164,324.

SUMMARY OF THE INVENTION

An alarm printer having an improved (solid state) decoder for interpreting and converting the intelligence received from pulse coded serial information and the number of rounds of code received, and printing the required data in clear written form, i.e., in English words and numerical values.

BRIEF DESCRIPTION OF THE DRAWING

FIGURE 3 describes how FIGURES 3a through 3i are to be assembled relative to one another to form a complete schematic;

FIGURES 3a through 3i form a complete schematic diagram of the printer and decoder disclosed in block diagram form in FIGURES 1 and 2;

FIGURE 4 shows a typical complete alarm system for which the alarm printer is particularly adapted;

FIGURES 5a, b, and c show a typical coded transmitter code wheel, the electrical pulses resulting from a transmission, and a sample printout of the coded message;

FIGURES 6 to 9 disclose several logic elements in symbolic form as used in FIGURE 3;

FIGURE 6 shows a two-input nand gate;

FIGURE 7 shows a two-input nor gate;

FIGURE 8 shows an expandable gate;

FIGURE 9 shows an RS flip-flop;

DESCRIPTION

Figure 1:
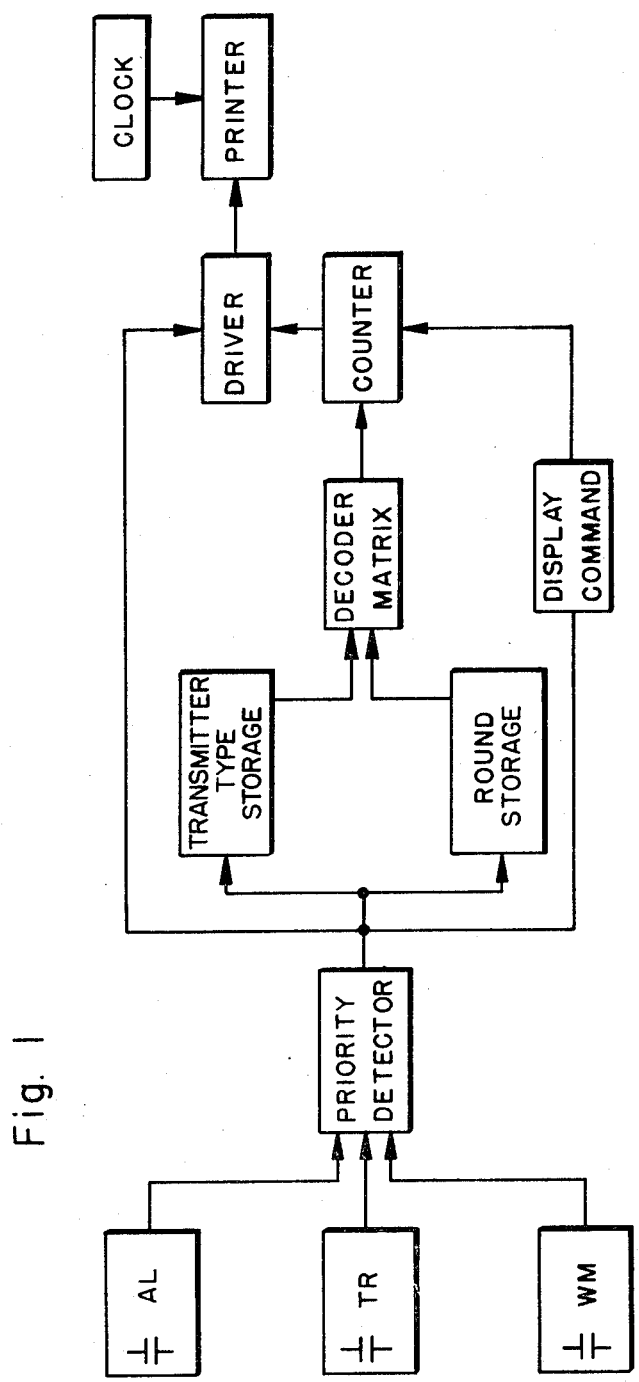
FIGURE 1 is a basic block diagram presentation of the alarm printer.

An important consideration in any protection system is to provide means of recording system operation. The prime purpose of the present invention is to provide this function. Coded proprietary and local alarm systems as well as watchman's tour systems require a means of receiving and recording all coded signals coming into a local fire alarm panel. These signals are received in the form of an electrical pulse code and recorded by the alarm printer for permanent record.

Many alarm recorders used in the past are a punch-tape type recorder. This provides a permanent record, but it must be translated by human means from the punch state to determine the zone code. Alarm, trouble, and restoration signal which are received must be distinguished by the number of rounds of coded signals which must be read from such punched tape. If two or more signals such as alarm and restoration, are received simultaneously, it becomes difficult, if not impossible, to separate and translate the coding on punched tape.

The present apparatus receives the coded signal, interprets the type of transmitter, and prints out the type of alarm in words, transmitter location, month, day, year, and time of day. Thus, there is no need to count the holes in a punched tape to determine the type of transmitter and therefore is eliminated the possibility of error in the interpretation. Fire and waterflow alarm signals are printed out immediately after each round of code so that no delay is encountered. The "type" and "condition" of the alarm is printed in words (fire alarm, flow alarm) so that no time is lost in counting punches and counting rounds of code in the tape and interpreting their meaning.

Trouble signals, supervisory signals, security signals, restoration signals, and emergency signals are printed out once after the proper number of rounds of code are completed. The alarm printer receives a coded signal and counts the rounds of the code and then prints out the identification in words together with the zone in digits together with the date and time.

Watchman's tour stations provide a single round of coded signal and are therefore printed out once on each code transmission.

FIGURE 4 shows a block diagram of a typical alarm system with which the printer is used. It may be seen that a number of condition responsive coded transmitters (for example, fire boxes, waterflow, valve supervision, security), feed signals to a local fire alarm panel receiver where the signals may be directed to a first or second channel priority and decoded by the alarm printer. The alarm printer is programmed to give fire and waterflow alarm priority over any other signal. Supervisory abnormal signals, security signals, emergency signals, and restoration signals have priority over watchman's tour signal. Therefore, if two or more signals happen to come in at the same time, the signals with the highest priority will be printed out. In other words, any coded transmission being received on the second or third priority level will be cancelled if a simultaneous transmission is received on the first priority level.

BASIC BLOCK DIAGRAM

In the present apparatus the coded signal messages that are received may consist of one or more rounds of coded pulses and each round consists of successive groups of pulses. Each of the successive groups of pulses provides intelligence to a separate function of the printer, i.e., the first group provides reset, the second group identifies the "type" of transmitter and advances the type wheel of the printer, and the following groups identify the transmitter location. In the decoder apparatus selector means (priority detector, coincidence switch 1, relay driver, group timer, shift counter) receives the coded message and selectively assigns the successive groups of pulses to the separate functions of the printer. Round counting means of the decoder store the number of rounds counted while transmitter type counting means stores the number of pulses in the transmitter type group. Then at the end of the message to deliver the final intelligence to the printer (identifying the "condition" function), the decoder matrix combines the output from the round counter and from the type counter to generate a matrix output indicative of the particular combination.

Turning now to the basic block diagram of the alarm printer of FIGURE 1, three isolated contacts, an alarm contact, a trouble contact, and a watchman's tour contact are operated by means not shown to deliver the coded input data.

The input from the three channels passes through the priority detector to be decoded. If more than one channel is simultaneously receiving data, only the one of the highest priority passes through the priority detector into the printer. The transmitter type data of the message is fed directly into the printer and is also stored in the transmitter type storage. In the same manner the zone code is entered directly into the printer.

In order to determine the "condition" the alarm printer must wait until the complete number of rounds is received. The rounds are stored in the round storage. After the last round is completed, the combination of transmitter type pulses and the number of rounds determines the "condition" signal. This determination is made in the decoder matrix.

The decoder matrix sets a counter; and after the display command is given, the counter enters the stored number of pulses into the printer. As the printer receives the condition pulses, the information is completed and printout is accomplished.

DETAILED BLOCK DIAGRAM

Figure 2:
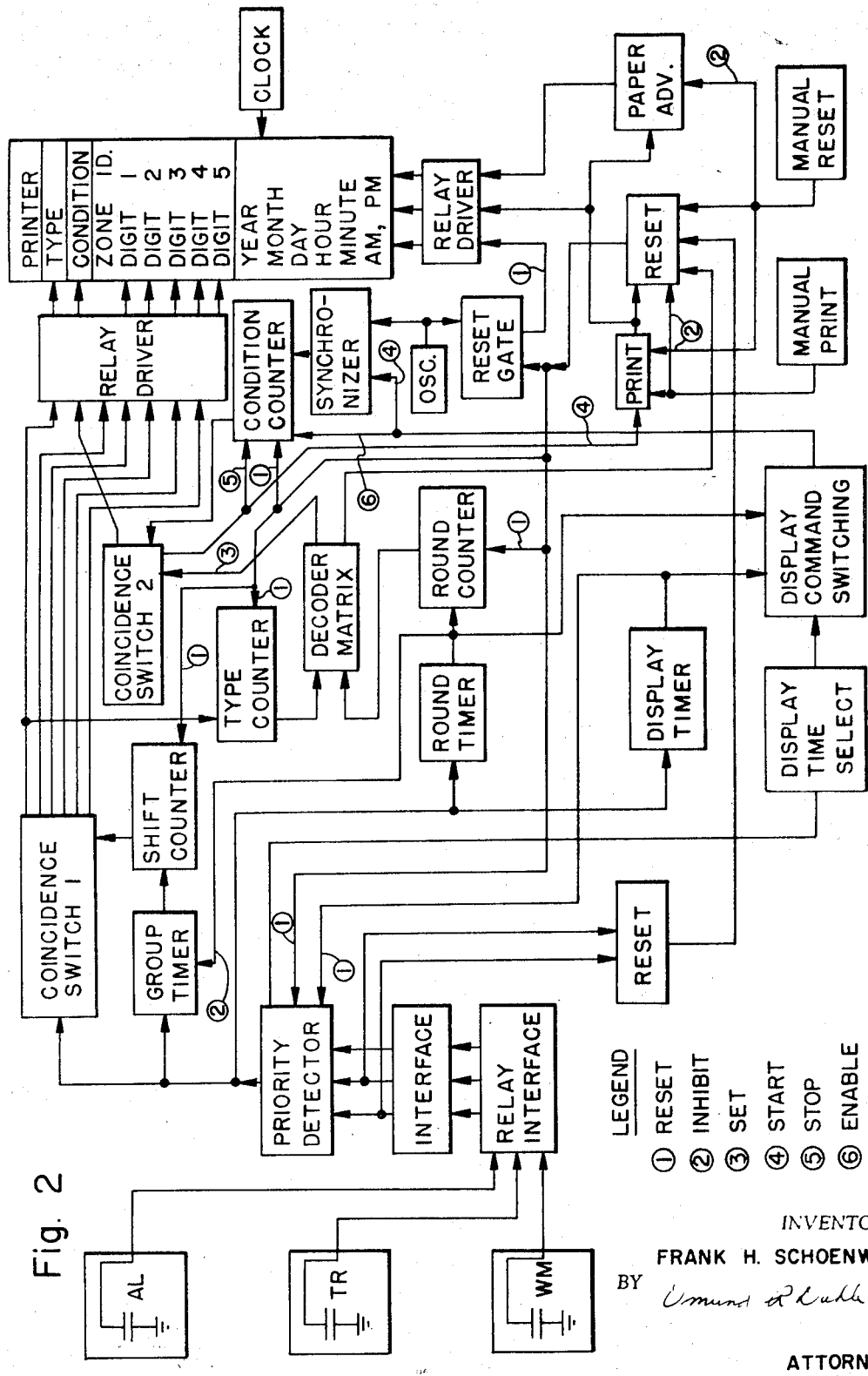
FIGURE 2 is a more detailed block diagram of the alarm printer.

Turning now to the more detailed block diagram of FIGURE 2, it may be seen that the three isolated contacts of alarm, trouble, and watchman transmit the code pulses to a relay interface and a logic interface. The relay interface provides double-throw contacts to properly match the various transmitter contacts into the printer system. Because of unwanted contact bounce occurring in mechanical switch contacts when the switch is closed, the logic interface is used which comprises three input flip-flops, one for each contact, to clean-up the signal and convert the multiple pulses resulting from contact bounce at the relay interface into a single pulse which will not confuse the decoder. The incoming signals then pass through a priority detector which has been discussed above. In the case of information arriving on the alarm or trouble channels, the first pulse received will reset the printer, the logic, the group timer, the round timer, and the display timer.

The second group of pulses, which contains the transmitter type identification, is fed through the coincidence switch into the type counter and also through the relay driver into the printer.

Between pulse group 2 and pulse group 3, the group timer delivers an output pulse into the shift counter and advances the shift counter from count zero to count one. The shift counter controls the coincidence switch which shifts the information and opens the channel for zone identification code 1. The complete group 3 will be transmitted through this channel and be fed through the relay driver to the printer. Between groups 3 and 4 the group timer delivers another pulse and advances the counter and coincidence switch from count 1 to count 2 so that the coincidence switch shifts the information and opens the next channel for zone identification code 2. The same procedure repeats for code groups 5, 6, and 7.

After the last pulse of the last zone identification code is completed, the round timer indicates the end of a round. This pulse advances the round counter from count zero to count one and also inhibits the group timer from operating if a second round appears. At the end of each round, the round timer will feed a pulse to the round counter to be stored. The stored information of the type counter and the round counter are decoded by the decoder matrix which determines the "condition" to be printed out.

The end of the transmitter message is determined by the display or end-of-message timer which measures the time since the last round and determines that the time has exceeded the time between rounds. The display timer is reset by the first pulse of each round. As the display timer determines that the last round has been received, the command to print is given. The display command signal provides an enable signal to the condition counter and a start signal to the synchronizer. The synchronizer pulses are counted by the condition counter and fed to the printer. The synchronizer pulses are counted by the condition counter and when this count equals the value set into the coincidence switch from the decoder matrix, the counter is stopped and the printout starts. After the printout occurs, the paper advances to make the last print visible in the viewing window of the printer, and the printer and the logic reset.

While information coming in on the trouble channel is printed only at the completion of all the rounds, the display time selector is sensitive to signals arriving on the alarm channel and watchman channel and provides a signal to the display command switching to cause a printout at the end of each round.

LOGIC SYMBOLS

Several logic symbols are shown in the various schematics and will be described below. The nand/nor gates used in the printer are of the DTL (Diode Transistor Logic) type. The nand gate is shown in FIGURE 6 and the nor gate is shown in FIGURE 7. These gates may be two-input gates, three-input gates, or four-input gates.

The nand function can be realized in positive logic. This means in the case of two input gates, that input A and input B have to be a "logical 1" (or high, or positive) in order to cause a change at output F to be "logical 0" (or low, or ground). The inputs were previously assumed to be at ground potential.

The nor function can be realized in negative logic. This means in the case of the two-input gates, the input A or input B (either one or both) have to be a "logical 0" in order to cause a change of output F to a "logical 1." The inputs were previously assumed to be at a positive potential.

Where a gate with more than four inputs is needed, the four-input expandable nand/nor gate is used. This gate is shown schematically in FIGURE 8. Each additional input is generated by tying a diode to the expander node E.

The negator is also represented as shown in FIGURE 7, and it inverts the output signal of outer logic elements. This is accomplished by using a two-input gate and tying the unused input terminal to the positive potential.

The RS flip-flop (reset and set), shown in FIGURE 9, which is the simplest kind of flip-flop, is accomplished by using two-input gates and tying the output of each gate to one input of the other gate. This flip-flop is triggered with the negative-going slope of an input pulse (e.g. the trailing edge of a positive pulse). If input S sets the flip-flop to provide a "logical 1" at output Q, an input pulse at R resets the output Q to a "logical 0." The output at $\bar{Q}$ is the converse.

The well-known J-K flip-flop is used in each of the counters of the decoder.

FIGURES 5a and 5b illustrate the sequence of input pulses to the alarm printer from a sending transmitter. Each pulse group is separated by one missing tooth on the code wheel. The serial input code to the alarm printer consists of up to seven pulse groups wherein the function of these pulse groups is listed below:

Group 1 provides a "reset" function and consists of at least one pulse which resets the printer and the associated logic circuits.

Group 2 provides the transmitter type identification and may contain from 1 to 6 pulses e.g., fire, supervisory, flow, security, emergency, or watchman.

Group 3 is the first digit of the "zone identification code" which indicates the location of the sending transmitter.

The groups 4 through 7 provide the second through fifth digits of the zone identification code of the sending transmitter.

While group 2 contains the information of the transmitter "type," the "condition" is determined by counting the number of rounds of information, the various conditions including by way of example, alarm, trouble, restoration, abnormal and tour.

INTERFACE AND PRIORITY DETECTOR

Turning now to the schematic diagram of FIGURE 3 and especially 3a, the single-pole, double-throw contacts 10, 11 and 12 show in detail the relay interface which is used between the mechanical contacts of the input relays and the logic of the alarm printer. Contacts a and b of the double-throw switch 10 are connected by input terminals 13 and 14 to the inputs S and R of a logic interface flip-flop 15. The switch 10 and the flip-flop 15 are in the alarm channel. The contacts a and b of double-throw switch 11 are connected by conductors 16 and 17 to the opposite inputs S and R of the logic interface flip-flop 18. The switch 11 and the flip-flop 18 are in the trouble channel. The contacts a and b of the double-throw switch 12 are connected by conductors 20 and 21 to the inputs of a flip-flop 22. The switch 12 and flip-flop 22 are in the watchman input channel. The diodes in the input lines 13, 14, 16, 17, 20 and 21 protect the logic against negative voltage in the input lines. The logic flip-flops 15, 18, and 22 are triggered by the double-throw contacts 10, 11, and 12, respectively, and the flip-flops are effective to eliminate the effects of any contact bounce in the switch contacts. This is because after an RS flip-flop has changed state in response to a pulse, additional trigger pulses at the same terminals do not affect the output. The effect of contact bounce must be eliminated because other logic elements in the decoder have a response rapid enough to follow each contact bounce pulse.

The $\bar{Q}$ output of flip-flop 15 is connected to the S input of automatic reset pulse generator flip-flop 23 by a conductor 24, the $\bar{Q}$ output also being connected to the S input of an alarm priority flip-flop 25, and to the D input of a three-input nor gate 26. The $\bar{Q}$ output of flip-flop 23 is connected through a negator 30, and a capacitor 31, to input A of a nor gate 32, from the output of gate 32 through a negator 33 to a reset pulse output conductor 34.

The output Q of trouble flip-flop 18 is directly connected to intput B of nand gate 35. Input A of nand gate 35 is directly connected to the output $\bar{Q}$ of alarm priority flip-flop 25 so that gate 35 inhibits any trouble signals while an alarm signal is being transmitted. The Q output of watchman flip-flop 22 is directly connected to an input C of a three-input nand gate 36. Input A of the nand gate 36 is connected by a conductor 37 to receive a signal from alarm priority flip-flop 25 terminal $\bar{Q}$, and input B of nand gate 36 is directly connected to output $\bar{Q}$ of a trouble priority flip-flop 40 so that gate 36 inhibits a watchman signal while an alarm or a trouble is being transmitted. Input S of trouble priority flip-flop 40 receives its signal from the output of nand gate 35. This output is also connected to input C of nor gate 26.

A display time selector 41 comprises a two-input nor gate 42 having its input B directly connected to the output Q of trouble priority flip-flop 40 by a conductor 44, its input A connected to the output $\bar{Q}$ of alarm priority flip-flop 25, and its output connected through a negator 43 to a conductor 53. The conductor 44 is also connected through a negator 45 and capacitor 46 to the input B of nor gate 32.

The output of nand gate 36 is directly connected by a conductor 47 to the input A of nor gate 26. The nor gate 26 provides the main data output from the interface and priority detector on a conductor 50 to a round timer, a display timer, and a group timer which will be discussed in more detail below. The alarm priority flip-flop 25 provides an output from its terminal Q on a conductor 51 to input C of a nand gate 52 in the decoder matrix (FIGURE 3f). This connection delivers an enable signal from the alarm priority flip-flop to the decoder matrix. The output 43 of the display time selector is connected by a conductor 53 to input B of a nand gate 54 in the display command switching.

This output from the display time selector 41 determines whether the printer prints out after each round or after a number of rounds of received code.

A reset pulse is received after every round on the conductor 55 and is applied to the R input of flip-flop 23. A reset pulse for the priority flip-flop received from the display timer 62 on conductor 56, passes through negator 57 and then by conductor 60 to the R inputs of flip-flops 25 and 40.

TIMERS AND SYNCHRONIZER

FIGURE 3b discloses the details of the display timer, the round timer, the group timer, the display command switching and the synchronizer. The timers and the synchronizer analyze the train of input pulses in all three input channels. The timers determine when a group is over, when a round is over, when a number of rounds constituting the message are over and gives the display command. The synchronizer insures that only full pulses are delivered to the printer and the counters.

The main data output from the priority detector is received on conductor 50 and is fed through a negator 61 to the set inputs of the display timer 62 and the round timer 63. This main data signal on conductor 50 is also fed to input A of a nand gate 64, the output of which connects to the input of the group timer 65, and also connects to the input of coincidenec switch 1 (FIGURE 3e) at nand gate 114a to provide the main pulse data to the coincidence switch for direction to the printer.

This group timer 65 may also be referred to as the space detector timer and is a timer having a period of approximately one second. The end-of-round timer 63 has a period of approximately two-seconds and the end-of-message timer or display timer 62 is a 16-second timer. These timer periods may, of course, be changed to accommodate the transmitter and transmitted message characteristics in use.

The input to the group timer 65 from the nand gate 64 connects directly to the S input of an RS flip-flop 66. The Q output of flip-flop 66 is connected through two diodes 67 to one plate of timing capacitor 70, the other plate of which is grounded. The first plate of capacitor 70 is connected by a timing resistor 71 to a source of positive potential. The capacitor is also connected to the emitter of a unijunction transistor 72, the upper base of which is connected to the positive source and the lower base of which is connected through a resistor to ground. In addition, the lower base is connected to the base electrode of an N-P-N transistor 73, the emitter of transistor 73 being grounded and the collector being connected through a resistor to a positive potential. An output signal is taken from the group timer at the collector of transistor 73 through a conductor 74 to input A of a nor gate 75. Input B of the nor gate 75 receives its signal from the main reset to be described further below. Output F of the nor gate 75 transmits a signal through a negator 76 and a conductor 77 to the R input of the group timer flip-flop 66. A diode 80 is also connected from the capacitor 70 back to the input S of the group timer 65 so that with every negative-going pulse received through the nand gate 64 the timing capacitor 70 is reset toward zero through the diode 80. As long as there is a continuous chain of pulses, the voltage on capacitor 70 never reaches the firing point of unijunction 72. As soon as there is a missing pulse, which indicates the end of a group, the unijunction 72 does fire, which causes transistor 73 to conduct and provide a negative pulse on conductor 74 to the input of nor gate 75. The resulting negative-going pulse on conductor 77 resets the flip-flop 66 and also a flip-flop 106 in the synchronizer 96 which will be discussed below. The Q output of the flip-flop 66 is connected by a conductor 81 into the shift counter (FIGURE 3c) to provide the counter input.

The round timer 63 is similar in construction to the group timer and the details of the construction will not be reiterated. The components of the round timer carry the same idenitfying numerals as used in the group timer but with a suffix a. The Q output of the flip-flop 66a provides the flip-flop output on conductor 81b to the input of the round counter (FIGURE 3d).

The round timer output at the collector of transistor 73a provides a signal on the conductor 55 to reset the flip-flop 23 in the priority detector. The same signal also provides a reset for the flip-flop 66a in the round timer and also provides a set input into a flip-flop 83. Flip-flop 83 has a first output $\bar{Q}$ which is connected by a conductor 84 to the B input of nand gate 64 to inhibit the introduction of further pulses into coincidence switch 1 and to inhibit the operation of the group timer after the first round is completed. The Q output from the flip-flop 83 is connected by a conductor 85 into the B input of a nand gate 86 in the display command switching 87.

The end-of-message timer or display timer 62 is similar in construction to the group timer and the round timer and details of the elements will not be repeated. The components of the display timer carry the same identifying numerals as used in the group timer but include a suffix b.

The display timer output at collector of transistor 73b is connected by means of a conductor 90 into the display command switch 87 through a negator 91 into the input A of a nand gate 54. The collector output of transistor 73b is also connected to the A input of a nor gate 92, the output of which has been previously described as connecting a signal by means of the conductor 56 to provide a reset function to the priority detector. The input B of nor gate 92 is connected to receive the manual reset signal.

The display command switching 87 will now be described in more detail. It has been previously mentioned that the output of the display time selector 41 is coupled into the display command switching by conductor 53 to the B inpu of nand gate 54. The same signal also provides the input through a negator 93 to input A of the nand gate 86. The outputs F of nand gate 54 and nand gate 86 are connected together and to set input of the display command flip-flop 94. The $\bar{Q}$ output of flip-flop 94 is connected by a conductor 95 to provide a condition start signal into synchronizer 96 at the input of a negator 97. The Q output of display command flip-flop 94 provides an end-of-message output on a conductor 100 to the coincidence switch 2 (FIGURE 3h) at the input to a nand gate 101, and also provides an input into a nand gate 102 (FIGURE 3g).

The synchronizer 96 receives an input from a free-running 30 Hz. oscillator 103. The capacitor and negator 104 differentiate the trailing edges of the positive oscillator pulses and feed them to the input B of nand gate 105. The output of the nor gate 97 is also connected to the nand gate 105 at input A. Output pulses from the nand gate are connected to the set input of the synchronizer flip-flop 106. The output Q of flip-flop 106 is connected to the input A of a nand gate 107, input B of which receives the oscillator 103 pulses. The output of nand gate 107 is passed through a negator 110 and a conductor 111 to an input of the nand gate 101 in FIGURE 3h.

SHIFT COUNTER

Figure 3C:
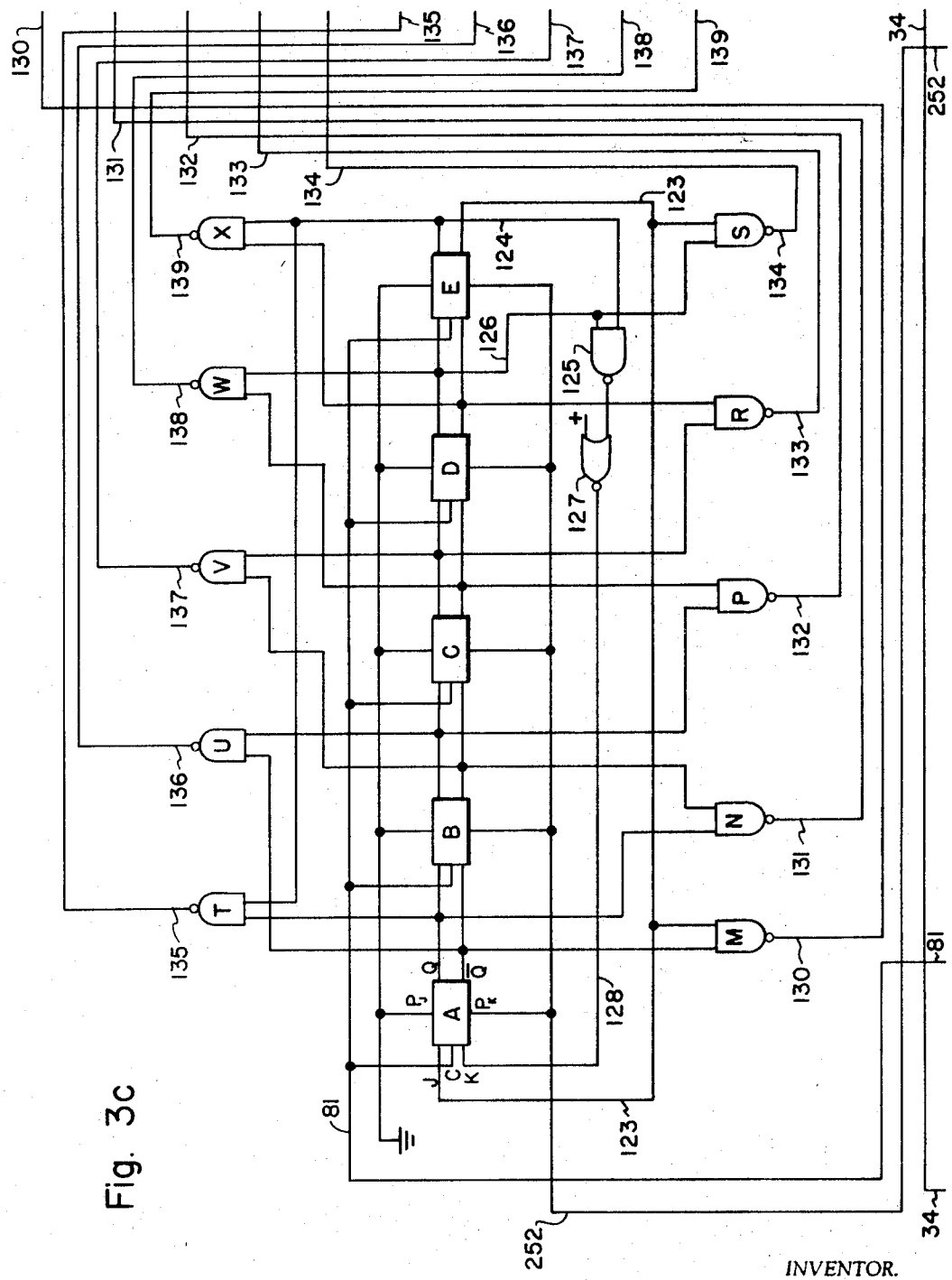

Turning now to FIGURE 3c there is disclosed a ring counter, here used as a shift counter, which can count from zero to nine. The identical type counter is also used as the type counter and round counter (FIGURE 3d), and as the condition counter (FIGURE 3f). In FIGURE 3c, where the counter is shown in detail, five J–K flip-flops A, B, C, D and E are the counting elements which allow ten different combinations of flip-flop conditions. With input clock pulses being applied to the counter on conductor 81 from the output of the group timer 65, the counter is able to count from zero through nine. The counter input on conductor 81 should normally be a logical zero. A positive input pulse is supplied from the group timer on the counter input 81, but the counter advances only at the negative-going, trailing edge of each pulse.

It will be noted that the J–K flip-flop element A has at the left-hand, a clock input C, an input J, and an input K. In addition, the flip-flop has an input $P_J$ and an input $P_K$. The outputs are Q and $\bar{Q}$ as in the case of the RS flip-flops. This J–K flip-flop is a universal-type flip-flop which can act as an asynchronous flip-flop using inputs $P_K$ and $P_J$ provided inputs J, K, and C are grounded. In the present situation the J–K flip-flop is operated synchronously and terminal C is the clock input. If input J and input K are a logical 1, the output state of the flip-flop will always change when a clock pulse is applied. A reset pulse is applied to the paralleled $P_K$ inputs to reset the counter to zero.

The truth table relating to the J–K flip-flops is shown below:

J–K FLIP-FLOP TRUTH TABLE

| Q=1⟶0 | Q=0⟶1 | Q=0⟶0 | Q=1⟶1 |
|---|---|---|---|
| J=0 or 1<br>K=1 | J=1<br>K=0 or 1 | J=0<br>K=0 or 1 | J=0 or 1<br>K=0 |

Thus, it can be seen from the truth table that if the output Q is presently at a state of 1, and it is desired that it goes to 0, it will do so if input K=1 and input J is equal to either 0 or 1 and a clock pulse is applied to input C. It can also be seen from the truth table that if the output Q presently is 1, and it is desired that it remains at 1 and does not toggle, this will be accomplished if the input at K is zero. A clock pulse will now have no effect.

In FIGURE 3c it will be seen that the Q and $\overline{Q}$ output of J-K flip-flop A are directly connected, respectively, to the J and K inputs of the flip-flop B; that the outputs of B are similarly connected to C; that the two outputs of flip-flop C are similarly connected to the inputs of flip-flop D; and that the outputs of flip-flop D are similarly connected to the flip-flop E. The output $\overline{Q}$ of flip-flop E is directly connected by a conductor 123 and to the J input of flip-flop A. The output Q of flip-flop E is connected by a conductor 124 to an input of a nand gate 125, the other input of which is energized from the Q output of flip-flop D on the conductor 126. The output of nand gate 125 is connected through a negator 127 and a conductor 128 to the input K of flip-flop A. The purpose of nand gate 125 and inverter 127 is to drive the counter always back to the decimal counting routine if noise upsets the counter to a pseudo noise routine.

Associated with the five J-K flip-flops are ten two-input nand gates identified as M, N, P, R, S, T, U, V, W and X. The outputs of the flip-flops are connected to the nand gates as follows: Flip-flop A, output Q to N and T, and output $\overline{Q}$ to M and U; flip-flop B, output Q to P and U, output $\overline{Q}$ to N and V; flip-flop C, output Q to R and V, output $\overline{Q}$ to P and W; flip-flop D, output Q to S and W, output $\overline{Q}$ to R and X; flip-flop E, output Q to T and X, output $\overline{Q}$ to S and M.

The nand gates M, N, P, R, S, T, U, V, W and X provide outputs, respectively, representing the numerals zero through nine on conductors 130 through 139.

COINCIDENCE SWITCH 1

Figure 3E:
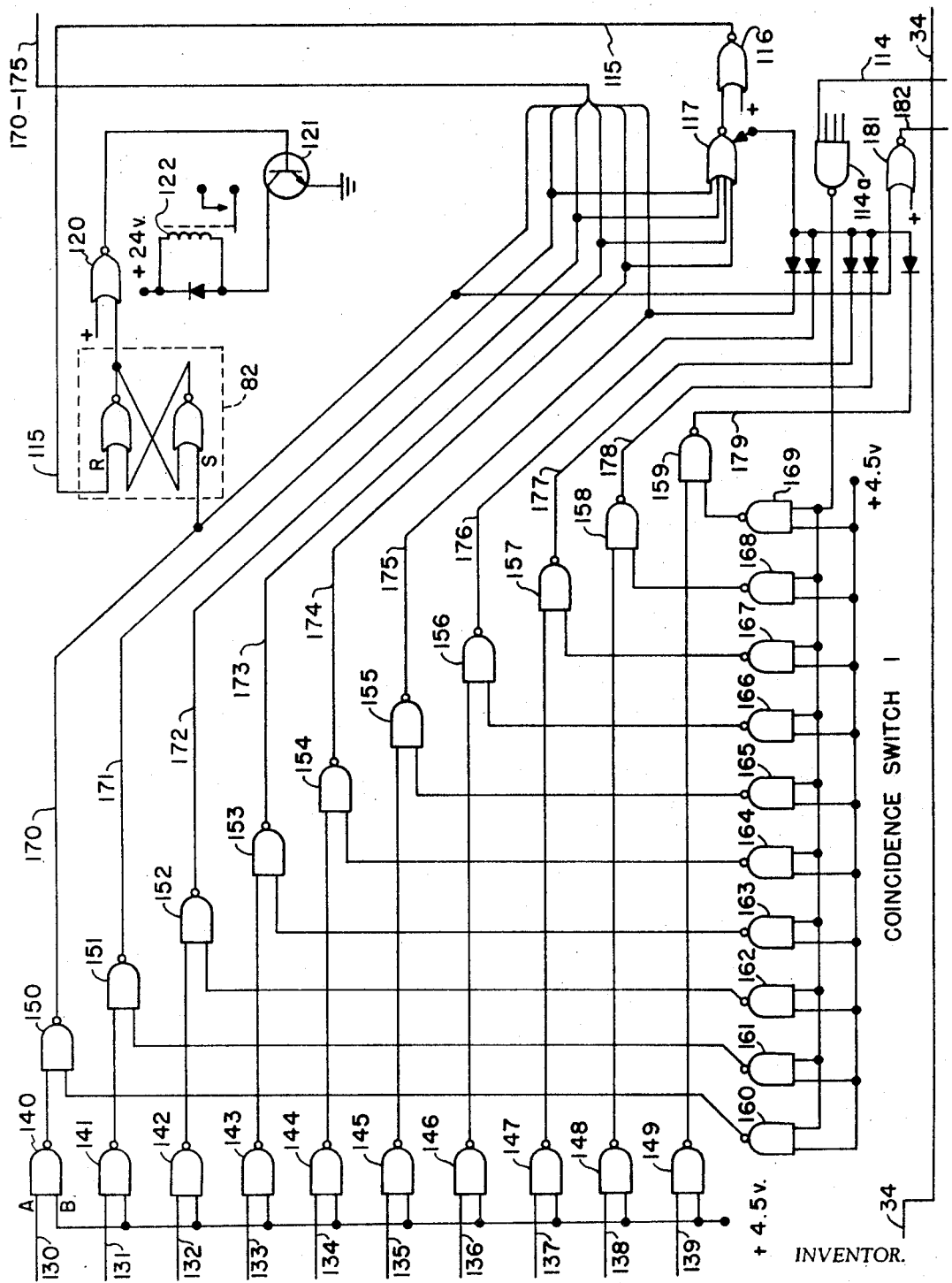
Figure 3G:
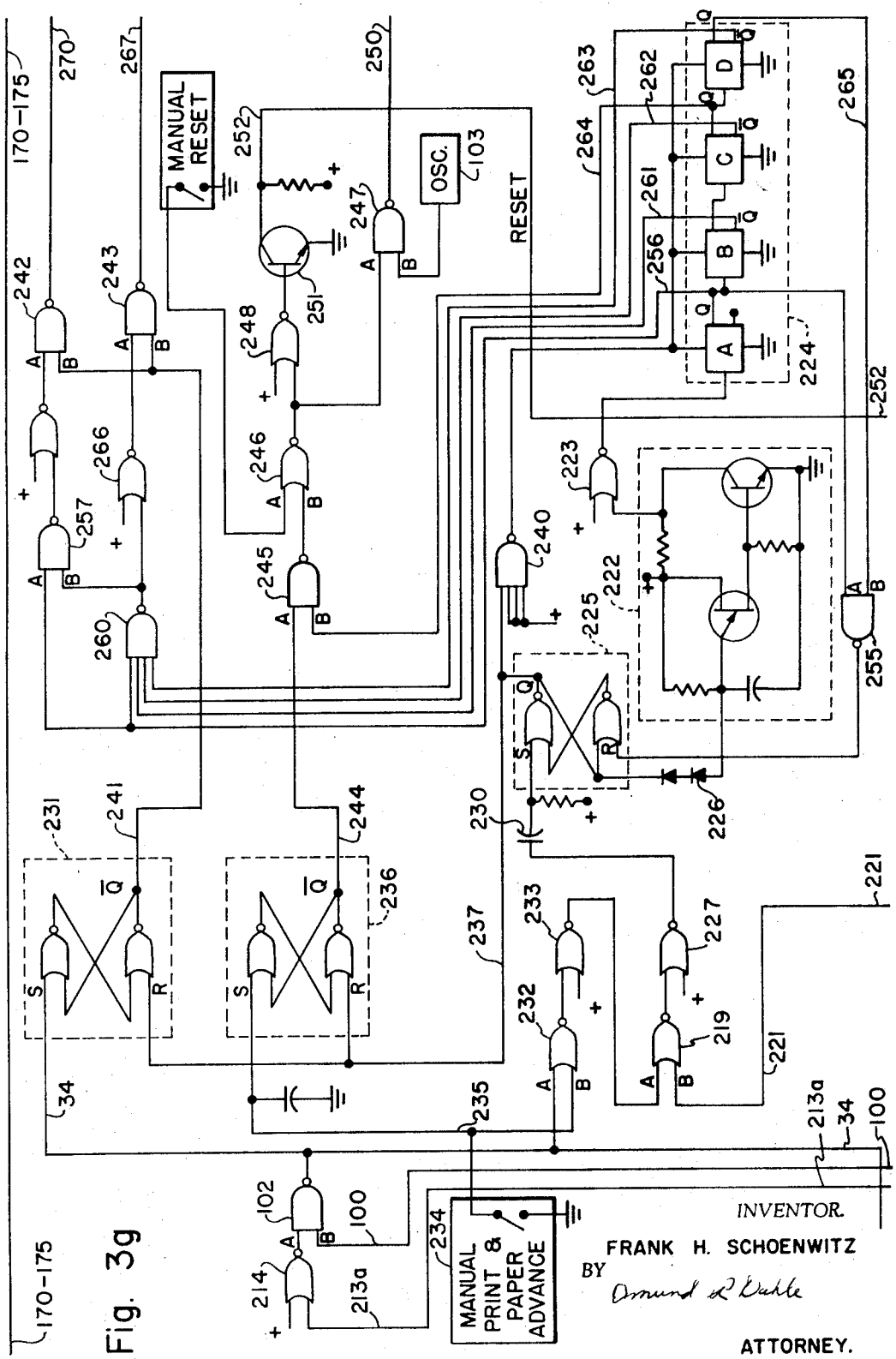

In FIGURE 3e, the conductors 130 to 139 inclusive, form the shift counter output of FIGURE 3c, are connected to the A inputs, respectively, of ten nand gates 140 through 149. The B inputs of these nand gates are all energized from positive 4.5 volts so these gates operate as negators. The outputs of the negators 140 through 149 are directly connected to the A inputs of a further set of nand gates 150 through 159, respectively. A further set of nand gates 160 through 169 inclusive, have their outputs connected, respectively, to the B inputs of the nand gates 150 through 159. The A inputs of the nand gates 160 through 169 are all connected to positive 4.5 volts. The B inputs of these gates are all connected together and to the output of the nand gate 114a previously mentioned.

It may be seen that the 20 inputs to the coincidence switches are all negated and fed into the nand gates 150 through 159. Any of these nand gates 150 through 159 will deliver an output signal if there is coincidence between its A and B input signal. Any data applied to the common inputs B of the gates 160 through 169 can be shifted to any of the ten outputs of gates 150 through 159 by applying a signal to the proper input terminals 130 through 139.

The nand gates 150 through 159 provide output signals on conductors 170 through 179, with conductors 170 through 175 providing a signal into relay driver stages (FIGURE 3i). Nine output lines 171 through 179 are summed in the expandable nor gate 117. The conductors 171, 172, 173, and 174 are connected to the input gates A, B, C, and D of the nor gate 117, and the other five output conductors are connected to the expandable gate through individual diodes. The output from nand gate 150 is also connected by the conductor 170 through a negator 181 and a conductor 182 to the counter input 81a of the type counter 183 in FIGURE 3d.

The reset input of bell silencer flip-flop 82 receives a signal on a conductor 115 which proceeds from the output of a negator 116 driven by nand gate 117. The set input of the flip-flop is connected to the output of gate 150. The output Q of the bell silencer flip-flop 82 is connected through a negator 120 to the base of a transistor 121. The collector electrode of transistor 121 is connected through a relay coil 122 to a positive potential source.

TYPE AND ROUND COUNTERS

Turning now to FIGURE 3d there is disclosed a type counter 183 and a round counter 184. These counters are identical in construction with the shift counter which was disclosed in detail in connection with FIGURE 3c; and therefore, the type and the round counter are shown in simplified form. The identifying numerals of the type counter follow those of the shift counter except that a suffix a is added and to the round counter identifying numerals, a suffix b is added. As described above, the type counter input 81a receives its counter input by way of a conductor 182, negator 181, conductor 170, and nand gate 150 of the coincidence switch 1. The outputs M, V, W, and X are not used. All of the counter outputs are connected into the decoder matrix. Output N is connected by way of a conductor 131a to input A of an expandable nor gate 185 in the decoder matrix (FIGURE 3f). Output P is connected by conductor 132a to input B of the nor gate 185. Output R is connected by a conductor 133a to input C of nor gate 185. Output S is connected by conductor 134a to the input D of the nor gate 185. Output T is connected by conductor 135a to the expandable gate E of nor gate 185. Finally, output U is connected by a conductor 136a to a negator 186 in the decoder matrix.

In the round counter 184, the input line 81b provides a counter input from the round timer flip-flop 66a. Outputs M, V, W, and X are not used. As in the case of the type counter, all of the counter outputs are connected into the decoder matrix of FIGURE 3f. Output N of the round counter is connected by a conductor 131b through negator 187 to the input of nand gate 196. Output P is connected by a conductor 132b to the A input of a nor gate 190. Output R is connected by a conductor 133b to input A of a nor gate 191. Output S is connected by a conductor 134b to the B input of nor gate 191. Output T is connected by a conductor 135b to the B input of the nor gate 190. Finally, output U is connected by a conductor 136b to the C input on the nor gate 190.

DECODER MATRIX

In FIGURE 3f there is disclosed a decoder matrix which evaluates the intelligence received from the type counter and from the round counter to provide an output which determines the "condition" being transmitted. The data which is stored in the type counter and in the round counter is decoded by the decoder matrix and is coupled into the condition counter by way of the coincidence switch 2.

In addition to the input gates of the decoder matrix which have been mentioned previously, that is, gates 185, 186, 187, 190 and 191, there are also two additional two-input nor gates 192 and 193 and a negator 194. The conductor 131a which represents a type count of 1, is connected to the B input of nor gate 193 as well as to the input A of the expandable nor gate 185. Conductor 132a (type count 2) is connected through negator 194 to the A input of nand gate 201 as well as to the B input of the nor gate 185. The conductor 133a (type count 3) is connected to the A input of nor gate 193 as well as to the C input of nor gate 185. Conductor 134a (type count 4) is connected to the A input of nor gate 192 as well as to the D input of nor gate 185. The conductor 135a (type count 5) is connected to the B input of nor gate 192 as well as to the expandable gate E of nor gate 185.

Considering now the three inputs into nor gate 190 from the round counter, it will be seen that conductor 132b represents two rounds, conductor 135b represents five rounds, and conductor 136b represents six rounds as stored in the round counter. Thus the outputs from the round counter which represent a restoration condition, that is, two, five or six rounds, are coupled into nor gate 190. The negator 187 accepts the one-round output of the round counter which indicates a trouble condition. The nor gate 191 accepts the three-round and four-round outputs of the round counter, three and four rounds indicating a security or emergency alarm condition.

The output from negator 187 (representing round count 1) is directly connected by a conductor 195 to the input A of a two-input nand gate 196, the input A of the three-input nand gate 52 and to the A input of a two-input nand gate 197. The output of the nor gate 190 is connected to the A input of a two-input nand gate 200. The output of the nor gate 191 is connected to the B input of a nand gate 201 and to the B input of a two-input nand gate 202. The output of nor gate 192 is directly connected to the input A of the nand gate 202. The output of the nor gate 193 is directly connected to the B output of the three-input nand gate 52. The output of the negator 186 (type count 6) is connected to the input B of nand gate 197.

At this point it is well to recall that the type counter is arranged to provide outputs from one to six, that a count of one indicates fire, a count two indicates supervisory, a count three indicates waterflow, a count four indicates security, a count five indicates emergency, and a count six indicates watchman. All of these type outputs are connected into the decoder matrix and it will be noted that type six is unique in that it is not connected to the expandable gate 185 as are the other five. The type outputs one and three representing fire, and waterflow are connected to the nor gate 193. The two-output of the type counter is connected to the nand gate 201 and the four and five outputs are connected to the nor gate 192.

The output of nand gate 200 (which represents restoration with any transmitter type but watchman) is connected by a conductor 203 to the input D of an expandable nor gate 204 and is also connected to the input A of a nand gate 143a in the coincidence switch 2. A signal on this line sets the coincidence switch to a three. The output of the nand gate 196 (which represents trouble with any transmitter type but watchman) is connected by a conductor 205 to input C of the nor gate 204 and also to the input A of nand gate 142a of the coincidence switch 2. A signal on this line sets the coincidence switch to a two. The output of the nand gate 201 (which represents abnormal coincident with supervisory) is connected by a conductor 206 to the B input of nor gate 204 and also to the A input of a nand gate 144a of the coincidence switch 2. A signal on this line sets the coincidence switch to a four. The output of the nand gate 197 (which represents tour coincident with watchman) is connected by a conductor 207 to the expander input E of the nor gate 204 and also to the input A of a nand gate 145a and the coincidence switch 2. A signal on this line sets the coincidence switch to a five.

The output of the nand gate 202 (which represents alarm coincident with security or emergency) is directly connected to the A input of a nor gate 210 while the output of nand gate 52 (which represents also alarm but coincident with fire or waterflow) is directly connected to the B input thereof. The output of nor gate 210 is coupled through a negator 211 and a conductor 212 to the input A of the nor gate 204 and also to the A input of nand gate 141a of the coincidence switch 2. A signal on this line sets the coincidence switch to a 1.

The nor gate 204 provided an output on a conductor 213 to the input B of the four-input nand gate 101 in the coincidence switch 2 (FIGURE 3h). The output of nor gate 204 is also connected by a conductor 213a through a negator 214 to the input A of the nand gate 102 in FIGURE 3g to provide inhibit signal to the nand gate when false information exists.

CONDITION COUNTER

The condition counter 215 (FIGURE 3f) is identical in construction with the shift counter described in connection with FIGURE 3c and carries the same identifying input terminal and output terminal numerals; however, the numerals include a suffix c. The condition counter input 81c receives its signal on a conductor 216 through a negator 217 which is directly coupled to receive the output of the nand gate 101 in the coincidence switch 2 (FIGURE 3h). The ten outputs of the condition counter are connected by conductors 130c through 139c to the A inputs of nand gates 160a through 169a of the coincidence switch 2. The B inputs of the nand gates 160a through 169a are all connected together to a positive 4½ volt source whereby these gates operate as negators.

COINCIDENCE SWITCH 2

The coincidence switch 2 shown in FIGURE 3h is used in connection with the decoder matrix and the condition counter and performs as a comparator. This coincidence switch 2 may be identical in construction with the coincidence switch 1 described above in connection with FIGURE 3e. In coincidence switch 2 the same identifying numerals, but including a suffix a, are used as in the earlier described coincidence switch. The input gates 141a through 145a receive inputs from the outputs of the decoder matrix. The input gates 160a through 169a receive the output from the condition counter 215. Coincidence of these signals is determined by the nand gates 150a through 159a. The outputs from all these gates are summed in the expandable nor gate 117a. The output of nor gate 117a is fed through negator 116a and directly to input A of the nand gate 101. The output from the nand gate 101 is directly coupled through the negator 217 and by the conductor 216 to the condition counter to provide the counter input pulses. The output of the nand gate 101 is also connected by a conductor 220 to provide the proper number of "condition" input pulses into the relay driver (FIGURE 3i). The output from the negator 116a in addition to being directly connected into nand gate 101 is also connected by a conductor 221 to the B input of a nor gate 219 of FIGURE 3g. Thus, the output of the coincidence switch 2 sends a "stop" signal to the condition counter on lead 216, provides the "condition" signal into the relay driver by conductor 220 and provides a "start" signal to the print mechanism by way of the conductor 221.

PRINT, RESET, AND PAPER ADVANCE

In FIGURE 3g there is disclosed the logic diagram for the print, reset, and paper advance; and this unit provides for all of the functions such as printing out the information, advancing the paper to allow the last print to be visible in the viewing window of the printer, and resetting the logic and the printer. The print, reset, and paper advance unit employs a conventional unijunction transistor timing element 222, which is designed to have a time period of 120 milliseconds. The output of the timer 222 is fed through a negator 223 to the input of a counter 224. A flip-flop 225 has an output Q which is connected through two diodes 226 to the input of the unijunction timing element. The state of the flip-flop 225 determines whether the unijunction timing element is operating; that is, when the Q output is zero, the capacitor in the unijunction timing element is prevented from charging and no output pulses are generated.

The output of the nor gate 219 mentioned previously, is connected through a negator 227 and a pulse capacitor 230 to the set input of the flip-flop 225.

The automatic reset is brought into the logic from the interface, FIGURE 3a, on the conductor 34 and is connected to the set input of the RS flip-flop 231. This conductor 34 is also connected to the A input of a nor gate 232, the output of which is fed through negator 233 to the A input of the nor gate 219. The false information reset is brought into this logic on the line 213a from the decoder matrix and is coupled through the negator 214 to the A input of the nand gate 102, the output of which is also connected to the conductor 34 and thus to the set terminal of the flip-flop 231 and to the A input of nor gate 232. The end-of-message signal from the display command switching is also coupled into this area of the logic on conductor 100 to the B input of the nand gate 102. A manual print and paper advance is connected by a conductor 235 to the set input of an RS flip-flop 236 and to the B input of the nor gate 232. The Q output of the flip-flop 225 is connected by conductor 237 to the reset inputs of the flip-flops 231 and 236. The Q output of the flip-flop 225 is also connected through a negator 240 to reset the counter 224.

Output $\bar{Q}$ of flip-flop 231 is connected by a conductor 241 to the input B of a nand gate 242 and the input B of a nand gate 243 to provide an inhibit signal to the print, and to the paper advance when a reset command is received on conductor 34. The output $\bar{Q}$ of the flip-flop 236 is connected by a conductor 244 to input A of a nand gate 245, the output of which is directly connected to the B input of a nor gate 246. The output of nor gate 246 is connected to the A input of a nand gate 247, the B input of which is energized from the 30 Hz. oscillator. The output of the nand gate 247 provides printer reset pulses on a conductor 250. The output of nor gate 246 is also directly connected through a negator 248 to the base of an N-P-N transistor 251. The collector output circuit of transistor 251 provides the main reset pulse on a conductor 252. This reset conductor 252 is connected to reset the condition counter 215, the prefix counter 183, the round counter 184, the shift counter, and in the timer and synchronizer panel (FIGURE 3b), is connected through a negator 253 (FIGURE 3b) to the reset input of the display command switching flip-flop 94, the reset input of the flip-flop 83 and to the B input of the nor gate 75.

The ripple counter 224 which is driven by the unijunction timing circuit has flip-flops A, B, C and D driven in tandem. In other words, the Q outputs of flip-flops A, B, and C are connected respectively, to the inputs of B, C, and D. The Q output of flip-flop A is connected to the A input of a nand gate 255, the output of which is connected to the reset input of flip-flop 225. Output Q of flip-flop A is also connected by a conductor 256 to the A input of a two-input nand gate 257 and to the A input of a four-input nand gate 260. Output $\bar{Q}$ of flip-flop B is connected by a conductor 261 to the B input of the nand gate 260. Output $\bar{Q}$ of flip-flop C is connected by a conductor 262 to the C input of the nand gate 260. Output $\bar{Q}$ of the flip-flop D is connected by a conductor 263 to the D input of the nand gate 260. The output Q of flip-flop C is connected by a conductor 264 to the B input of the nand gate 245. Output Q of the flip-flop D is connected by conductor 265 to the B input of the nand gate 255.

The output of the nand gate 260 is coupled to the input B of nand gate 257 to provide an inhibit to the paper advance channel when the print pulse is transmitted. The output of the nand gate 260 is also coupled through a negator 266 to the A input of the nand gate 243. The output of the nand gate 243 provides the print signal by conductor 267 into the relay driver.

RELAY DRIVER AND PRINTER

In FIGURE 3i there is disclosed the printer in the block diagram form, which printer accepts information to set up a type wheel, a condition wheel, five zone wheels, and the clock information including year, month, day, hour, minute, and a.m.-p.m. A typical printer which may be used for this application is the Presin Company Moduprint. In one successful embodiment of the invention the type wheel comprises several wheels connected in parallel and activated together as a unit. The combination wheels may be the same.

Ten relay driver current switching amplifiers 271–280 are connected in controlling relation to the various relays in the printer. The "type" signal is brought in from coincidence switch 1 on the conductor 170, and is fed through amplifier 271 to control the "type" print wheel. The "condition" signal is brought in from the coincidence switch 2 on the conductor 220 and is connected through amplifier 272 to the "condition" wheel of the printer. The zone information is received from the the coincidence switch 1 through conductors 171–175 and is connected through the amplifiers 273–277 to the respective zone wheels one through five. The paper advance signal is transmitted from nand gate 242 of FIGURE 3g through the conductor 270 and amplifier 278 to the printer. The print signal is transmitted from the output of nand gate 243 by way of the conductor 267 and amplifier 279 to the printer. The printer reset is transmitted from the output of the nand gate 247 in FIGURE 3g by way of the conductor 250 and amplifier 280 into the printer.

OPERATION

In considering the operation of the alarm printer decoder, it should be kept in mind that the overall system into which the printer must operate, as shown in FIGURE 4, for example, is one in which a transmitter sends a coded signal to a local fire alarm panel receiver where other uses than printing are made of the coded signal. In the case of fire or waterflow alarm the receiver generally causes bells to ring in coordination with the zone groups of the coded message so that the location of the transmitter is audibly sounded. The reset group and the transmitter type group of the coded message are needed for the printer but would only confuse if sounded audibly and therefore should be silenced by the decoder.

As stated earlier, it is important that the priority of received signals be considered. In this connection the operation of the printer decoder circuit will be described initially on the basis of a signal being received at the second priority trouble input 11. Referring again to the interface and priority detector of FIGURE 3a, let it be assumed that a transmission is commencing to report a "security alarm" type and condition at location 23211. The transmitter type identification group of the code will comprise four pulses (security) and the code will be transmitted for three rounds (alarm). It is intended to trace the signal flow resulting from the coded signal through the decoder and printer to set up the print wheels and print.

FIRST ROUND

The first pulse group to be transmitted, which consists of at least one pulse, provides the reset function. This reset pulse operates relay contact 11 to close its normally open contact 11a thereby providing a trigger pulse to the set input S of flip-flop 18 whereby output 180 rises to a logical 1 and is transmitted through the nand gate 35 (unless the alarm priority flip-flop 25 is operated) so that a logical 0 pulse is applied to the set input of trouble priority flip-flop 40 and to the C input of nor gate 26. Trouble priority flip-flop 40 is set whereby its output $\bar{Q}$ drops to a logical 0 and as a result the nand gate 36 inhibits any watchman signal from passing through the gate. Flip-flop 40 remains in the set position until reset from the display timer. The output 40Q rises to a logical 1 and is applied to the B input of nor gate 42 in the display time selector and is also supplied through negator 45 and capacitor 46 as a negative pulse to the B input of nor gate 32. The positive one-shot output pulse from nor gate 32 is negated at negator 33 and transmitted on conductor 34 to "set" the print and paper advance, inhibit flip-flop 231, and also through nor gate 232, negator 233, nor gate 219, negator 227 and capacitor 230 to "set" flip-flop 225 (FIGURE 3g). The resulting positive output at 225Q reverse biases the diodes 226 and timer oscillator 222 begins to free run. The positive output at 225Q is also negated at 240 and the zero level signal removes the reset signal from counter 224 so that it is allowed to respond to the pulses from oscillator 222.

As was stated above, the binary counter ripple counter 224 is different from the other counters and each stage may be thought of as a frequency decoder where B counts half as fast as A, C half of B, and D half of C. It will be observed that when the counter has advanced to provide a positive sginal at the Q output of stage C, FIGURE 11, wavefrom E, the nand gate 245 output drops to zero, the output of nor gate 246 rises, the output of negator 248 drops, the conductivity of transistor 251 is changed and a main reset pulse is transmitted on line 252. Simultaneously through nand gate 247, the print wheels are reset. The counter 224 continues to run until the Q output of flip-flop A and the Q output of flip-flop D are both positive whereupon nand gate 255 is operated and resets flip-flop 225. The oscillator 222 is then clamped, flip-flops 231 and 236 receive a reset signal, and counter 224 receives a reset through gate 240.

The main reset pulse on conductor 252 is effective to reset the condition counter 215, type counter 183, round counter 184, shift counter, display command flip-flop 94, flip-flop 83, synchronizer flip-flop 106, and group timer flip-flop 66. These events have happened in response to the first pulse group which was transmitted into relay 11 to cause reset of the decoder and printer.

The second pulse group to be transmitted in our example of a "security alarm" is the transmitter type identification group. It will comprise four pulses to represent "security." These four pulses are transmitted through flip-flop 18, nand gate 35, nor gate 26, and nand gate 64 to the input of group timer 64. The first pulse of the transmitter type group is a logical 0 into group timer flip-flop 66 and causes it to "set" whereupon its output Q rises to a logical 1. The diodes 67 which have previously kept capacitor 70 discharged are now reverse biased by the positive voltage at 66Q. Capacitor 70 is now in a position to charge through current limiting resistor 71 except for the negative input pulse which continues to maintain capacitor 70 discharged through diode 80. At the termination of the first transmitter type pulse capacitor 70 begins to charge; however, before the potential on the capacitor is sufficient to fire the unijunction 72, the second prefix pulse arrives at the input to flip-flop 66. It has no effect on the flip-flop which is already set; however, the zero voltage pulse discharges the capacitor 70 again through diode 80. The third and fourth transmitter type pulses again discharge capacitor 70 before unijunction 72 is fired.

The fourth pulse terminates the transmitter type group and in the space following this gorup, capacitor 70 charges sufficiently so that unijunction 72 fires, transistor 73 is pulsed "on" and a pulse from its collector is passed through nor gate 75, negator 76, and conductor 77 to reset flip-flop 66. Output 66Q drops to logical 0 and this signal which is connected by conductor 81 to the clock input of the shift counter (FIGURE 3c) causes the counter to advance one count.

Looking briefly at the shift counter, when the shift counter is reset, the quiescent condition is such that the five flip-flops each have a logical 0 at output Q and a logical 1 at output Q̄. Of the ten output gates it may be seen that after reset, only gate M has a logical 1 on both inputs. The logical 0 output of gate M is connected by conductor 130 through negator 140 to provide a logical 1 on input A of nand gate 150. As pulses from the group timer are received into shift counter input 81, the count is advanced so that a zero level signal appears sequentially on the outputs M through X. These signals are inverted and applied to the coincidence gates 150 through 159, respectively.

The four transmitter type pulses described above thus find coincidence at gate 150 and are conducted out on line 170 to driver amplifier 271 and set the "type" wheel of the printer to the fourth position in response to the four transmitter type pulses. The fourth position of the type wheels is designed to print the word "security" or a suitable abbreviation thereof. At the end of the transmitter type group when the group timer sends a signal to the shift counter to cause it to advance one count, described above, flip-flop A operates so that its Q output rises from 0 to 1 and its Q̄ output drops from 1 to 0. Now it can be seen that the output signal passes from gate M to gate N to place a positive signal on input A of coincidence gate 151.

The transmitter type pulses from gate 150 of the coincidence switch are also passed through negator 181 and connected by the conductor 182 to provide the input pulses into the prefix counter 183. The type counter counts up to four in response to the pulses. The pulses on conductor 170 are also connected to the reset input of the bell silencer flip-flop 82. The bell silencer circuit is interconnected with the alarm receiver panel to deactivate the receiver panel bell circuit during the transmitter type group and prevent the bells from sounding in accord with the transmitter type pulses.

The transmitter type pulses are also directed through negator 61 to the set inputs of the round timer 63 and the "end-of-message" or display timer 62 to set the flip-flops 66a and 66b. The pulses are effective to discharge capacitors 70a and 70b preventing unijunctions 72a and 72b from firing. The RC time constant associated with capacitors 70a and 70b are longer than for capacitor 70 so that the unijunctions 72a and 72b do not fire in the interval between pulse groups.

The transmitter type pulses are also directed on conductor 112, negator 113, and conductor 114 to coincidence switch 1 (FIGURE 3e). The pulses pass through gate 114a to the B inputs of negators 160 through 169 and thus in parallel to the B inputs of nand gates 150 through 159. The nand gates 150 through 159 are effective to direct the pulses arriving on conductor 114 to the correct print wheel.

The third pulse group to be transmitted in our example is the first digit of the zone code that indicates the location of the sending transmitter and two pulses are contained in this group. The two pulses are transmitted to the coincidence switch as before except that coincidence is now found in gate 151 and the pulses are transmitted on line 171 to amplifier 273 and then to the zone 1 printer wheel. The pulses on line 171 are also passed through nor gate 117 and negator 116 to "set" the bell silencer flip-flop to activate the bell circuit during the zone identification groups and allow the bells to sound in accord with the zone location. The third pulse group has the same effect on the timers 62, 63, and 65 as did the transmitter type pulse group. The unijunctions 72b and 72a in the display timer and round timer do not conduct, the flip-flops 66b and 66a are already "set" and continue in the "set" condition. The first pulse of the third pulse group sets flip-flop 66. After the two pulses are concluded, unijunction 72 fires to reset flip-flop 66 and provide another signal into the shift counter to advance it another count.

The fourth, fifth, sixth, and seventh pulse groups are the second, third, fourth, and fifth digits of the zone code and operate similarly on the decoder to set up the respective print wheels.

When the final group of the first round is completed, the group timer times out, unijunction 72 fires the flip-flop 66 again resets. By referring briefly to FIGURE 5a, it may be seen that while the spaces between pulse groups is relatively short, the remainder of the round provides a space (lack of pulses) which is substantially longer. During this period of time the end-of-round timer 63 times out, i.e., capacitor 70a charges sufficiently to fire unijunction 72a thereby providing an output pulse at 74a.

The output pulse from the round timer 63 is effective to set flip-flop 83. Output 83Q̄ drops from 1 to 0 so that the B input to nand gate 64 drops to zero and nand gate 64 becomes an inhibit gate to prevent the signal from additional rounds of code from reaching the group timer or the printer wheels which have already been properly set. The Q output of flip-flop 83 rises from zero to one when set by the pulse from the round timer and is applied to the B input of the nand gate 86 in the display command switch 87. The display command switch determines whether the information out of the end-of-round timer or out of the end-of-message (display) timer will be used to trigger the print command. When a message is being received on the trouble channel, as is the present case, the positive output of the trouble priority flip-flop terminal 40Q passes through the display time selector 41 to provide a logical 1 on the conductor 53 and into the display command switch 87. This signal is negated at 93 and applied as a logical 0 to the A input of nand gate 86. Nand gate 86 thus inhibits the signal from flip-flop 83 from getting through the display command switch and requires the display command switch to wait for a signal from the end-of-message timer 62. No printout is made at the end-of-round one.

The initial quiescent condition of the display time selector 41 is such that alarm priority flip-flop 25 is reset and therefore a positive signal is transmitted to input A of gate 42 of selector 41. Trouble priority flip-flop 40 is also reset so that a zero signal is transmitted to input B of gate 42. The resulting positive output of gate 42 is negated by gate 43 to transmit a logical 0 on line 53. If we have a signal on the alarm channel, input A of gate 42 drops to zero but this does not affect the output of the selector. Watchman signals completely by-pass the selector and do not affect it. Trouble signals "set" flip-flop 40, input B of gate 42 goes positive and the output reverses so that a positive signal is transmitted on line 53.

The output signal from the round timer 63 is also transmitted on line 55 to reset round timer flip-flop 66a and to reset the automatic reset pulse generator 23. In the present case, flip-flop 23 is already in the reset state because the signal is coming in on the trouble channel. When the flip-flop 66a is reset, the output Q drops to zero and this signal is transmitted on line 81b to the input of the round counter 184 to advance the counter by one count.

Since we are assuming the transmitter is to continue for three rounds, a new round will commence before the 16-second end-of-message timer 62 can time out and unijunction 72b does not fire at this time. There is therefore no output signal from timer 62.

ROUND TWO

The transmitter continues to run and the code wheel begins its second round of transmission. The first pulse to be transmitted is the reset pulse; however, since trouble priority flip-flop 40 is already set, this pulse has no function except to set the round timer flip-flop 66a, and to discharge capacitor 70b of the display timer through diode 80b. Nand gate 64 inhibits the signal from passing. The remaining pulse groups are effective only to keep on resetting the capacitors 70a and 70b to zero voltage. At the end of round two, the round timer times out again. The output pulse has no effect on flip-flop 83, which is already set, but does not reset flip-flop 66a so that another pulse is delivered to the round counter 184.

Round three commences before the display timer 62 times out and again there is no output signal from timer 62. At the end of round three the round timer again times out, is reset and sends a pulse on to the round counter which is now storing a count of three rounds. The transmission is now complete. A count of four has been stored in the type counter and a count of three in the round counter. The "type" wheel of the printer is properly set as are the "transmitter location" wheels. Only the "condition" wheels remain to be set.

TRANSMISSION COMPLETE

When the final round of transmission is completed, the end-of-message timer 62 times out after about 16 seconds. The output pulse appears at terminal 74b and operates to accomplish several functions. First, it resets the flip-flop 66b of the timer 62. Secondly, by way of conductor 90 and negator 91 it sets input A of nand gate 54 to a logical 1. Since input B of nand gate 54 was set to a logical 1 via conductor 53 as described before, output F of nand gate 54 changes to a logical 0 and sets R-S flip-flop 94 of the display command switch 87. Third, very short time later, by way of nor gate 92, conductor 56, negator 57, and conductor 60 it accomplishes reset of the alarm priority flip-flop 25 and the trouble priority flip-flop 40. In the present example only flip-flop 40 required a reset. When flip-flop 40 is reset, the output 40Q drops to a logical 0, is transmitted through the display time selector 41 and the signal on conductor 53 returns to a logical 0.

Flip-flop 94 has two outputs, the Q output rises to logical 1 and this signal is applied to the B input of false information reset nand gate 102 (FIGURE 3g) and also the D input of the gate 101 (FIGURE 3h). The $\overline{Q}$ output of flip-flop 94 drops to a logical 0 and is transmitted on line 95 to the synchronizer 96, where the signal is negated at gate 97 and the logical 1 output applied to the A input of nand gate 105. The synchronizer basically is a special gate between the oscillator 103 and coincidence switch 2. The trailing edges of the positive oscillator pulses are differentiated by capacitor 281 and negator 104. The first short output pulse of negator 104 which is coincident with the output signal of gate 97 passes through nand gate 105 and provides a set pulse for synchronizer flip-flop 106. The Q output of the flip-flop rises to a logical 1 to "enable" nand gate 107 so that only full oscillator pulses applied to the B input of nand gate 107 may pass. The synchronizer insures that the first pulse output is a full length pulse to prevent erratic operation of the printer which might result from a foreshortened first oscillator pulse. The positive oscillator pulses at the output of the synchronizer 96 are transmitted on line 111 to input C of the four-input nand gate 101 in coincidence switch 2. Thus, the outputs from the display command switch have enabled gate 101 and started the synchronizer to apply the oscillator pulses into the coincidence switch 2 which together with the condition counter gives pulses to advance the "condition" wheels of the printer.

DECODING THE PREFIX AND ROUNDS

As has been pointed out above, the output signals from the round counter 184 and from the type counter 183 are combined in the decoder matrix to provide the necessary information to set the condition wheel. In the example being followed there now is a count of four stored in the type counter and a count of three in the round counter, so that a logical 0 is transmitted on counter output lines 134a and 133b, respectively. The round counter output of three on line 133b is transmitted through nor gate 191 and the positive signal therefrom is applied to the B input of the alarm nand gate 202. The type counter output of four on line 134a is coupled through nor gate 192 to the A input of the alarm nand gate 202 so that with a logical 1 to both inputs, the output of nand 202 drops to a logical 0, is passed through nor gate 210 and negator 211 to provide a logical 0 on line 212. This alarm signal is negated by gate 141a and a logical 1 output is applied to the A input of coincidence gate 151a. The zero signal on line 212 is also applied to the input of nor gate 204 providing a logical 1 on the output lines 213 and 213a. This positive signal on line 213 is applied to the B input of the nand gate 101 so that with inputs A, B, and D positive and as the oscillator pulses from the synchronizer are received on input C of nand 101, the output pulses pass therefrom through negator 217 and lead 216 to step the condition counter 215. The output from the condition counter comes back into coincidence switch 2 sequentially at gates 160a to 169a to begin stepping down the coincidence nand gates 150a through 159a until the first coincidence is found. In the present example coincidence is found at gate 151a so that zero output appears on line 171a which is applied to nor gate 117a to cause its output to rise to logical 1; the signal is negated at gate 116a whereby the normally positive input A to nand gate 101 drops to zero and the gate turns off inhibiting any further pulses from the oscillator-synchronizer from getting through to the condition counter and stopping the count at that point. The pulses at the output of nand gate 101 are also transmitted through conductor 220 and amplifier 272 to the condition wheels of the printer to advance it simultaneously with the pulses advancing the condition counter. When the output at negator 116a dropped to zero this print start command signal is transmitted on conductor 221, through nor gate 219 and negator 227 to the set input of flip-flop 225 (FIGURE 3g).

Then the flip-flop 225 is "set" the output Q rises to a logical 1 and through gate 240 removes the reset signal from counter 224. In the reset condition the conductors 261, 262 and 263 have thereon a logical 1 signal and conductor 256 has a logical 0. The output 225Q having risen to 1, oscillator 222 begins to advance the counter 224. After the first count conductor 256 rises to a logical 1, nand gate 260 is operated to provide a zero output. This signal is negated to a logical 1 and applied to input A of print nand gate 243. Input B is already a logical 1 because the print inhibit flip-flop 231 is in the reset position so that the print signal is applied to the printer through amplifier 279.

Figure 11:
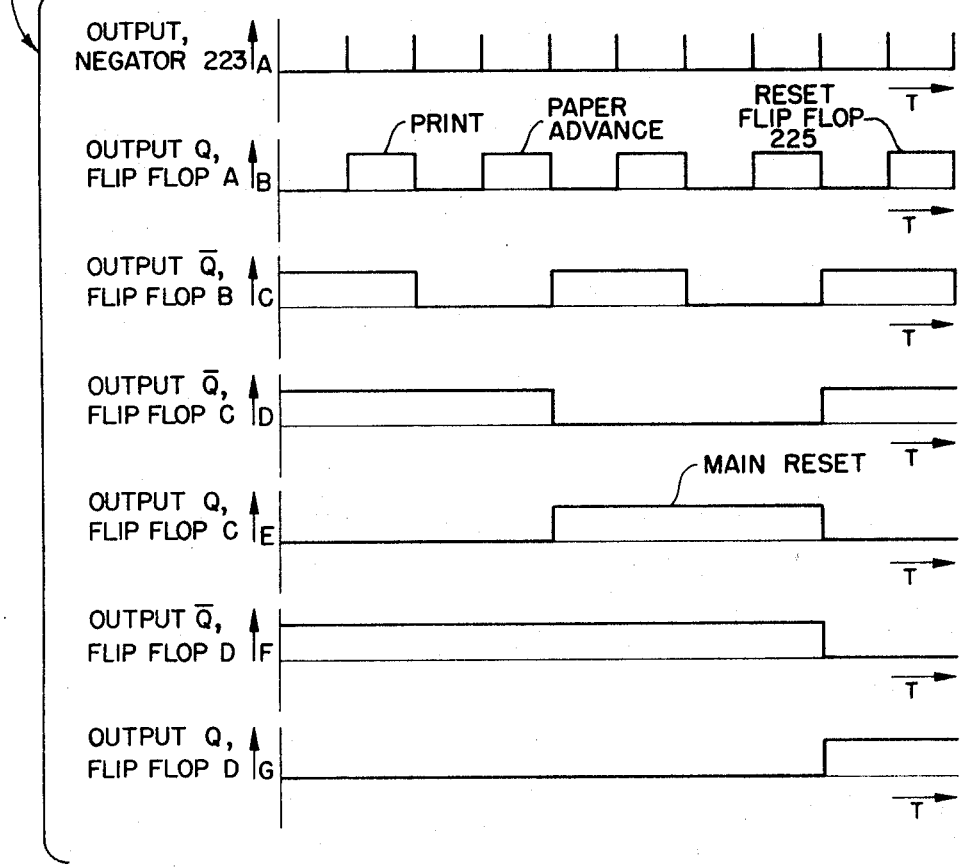
FIGURE 11 shows various waveforms concerned with operation of the printer.
Figure 10:
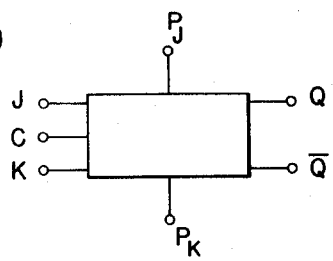
FIGURE 10 shows a J-K flip-flop.

FIGURE 11 discloses the output waveforms at the various output terminals of the binary counter 224. Referring now to waveforms B, C, D and F, which are applied to print nand gate 260, it may be seen that at the time waveform B is positive for the first time, all the signals are in order to cause a "print" command. At the time waveform B is positive for the second time, "paper advance" is accomplished. By referring to waveform E, the output Q of flip-flop C, it may be seen that after the print and paper advance signals are completed, this waveform becomes positive to initiate "mainreset" and "printer reset." When waveform B is positive for the fifth time, waveform G is also positive to reset flip-flop 225 and stop the oscillator 222.

In the table below other examples of outputs received from the decoder for different combinations of transmitter type and rounds are shown. In the transmitter type column the number (Example 131a) indicates the conductor connecting the type counter to the decoder matrix which has a logical zero. All other conductors between type counter and decoder matrix have a logical 1 signal thereon. In the rounds column the number or numbers (Example 132b, 135b or 136b) indicates the conductor connecting the round counter to the decoder matrix which has a logical 0. All other output conductors from the round counter have a logical 1 signal thereon. The decoder matrix has five output gates, 200, 196, 201, 211, and 197; and the logical output of each is shown in each case.

| | Type, Condition | Type | Rounds | RSN 200 | TBL 196 | ABN 201 | ALM 211 | TUR 197 |
|---|---|---|---|---|---|---|---|---|
| (1) | Fire, alarm | 1 (131a) | 3 or 4 (1) (131b) | + | 0 | + | 0 | + |
| (2) | Fire, trouble | 1 (131a) | 1 (131b) | + | 0 | + | + | + |
| (3) | Fire, restoration | 1 (131a) | 2, 5 or 6 (132b, 135b, or 136b) | 0 | + | + | + | + |
| (4) | Supervisory, abnormal | 2 (132a) | 3 or 4 (133b or 134b) | + | + | 0 | + | + |
| (5) | Supervisory, trouble | 2 (132a) | 1 (131b) | + | 0 | + | + | + |
| (6) | Supervisory, restoration | 2 (132a) | 2, 5 or 6 (132b, 135b, or 136b) | 0 | + | + | + | + |
| (7) | Flow, alarm | 3 (133a) | 3 or 4 (1) (131b) | + | 0 | + | 0 | + |
| (8) | Flow, trouble | 3 (133a) | 1 (131b) | + | 0 | + | + | + |
| (9) | Flow, restoration | 3 (133a) | 2, 5 or 6 (132b, 135b, or 136b) | 0 | + | + | + | + |
| (10) | Security, alarm | 4 (134a) | 3 or 4 (133b or 134b) | + | + | 0 | + | + |
| (11) | Security, trouble | 4 (134a) | 1 (131b) | + | 0 | + | + | + |
| (12) | Security, restoration | 4 (134a) | 2, 5 or 6 (132b, 135b or 136b) | 0 | + | + | + | + |
| (13) | Emergency, alarm | 5 (135a) | 3 or 4 (133b or 134) | + | + | + | 0 | + |
| (14) | Emergency, trouble | 5 (135a) | 1 (131b) | + | 0 | + | + | + |
| (15) | Emergency, restoration | 5 (135a) | 2, 5 or 6 (132b), (135b, or 136b) | 0 | + | + | + | + |
| (16) | Watchman tour | 6 (136a) | 1 (131b) | + | + | + | + | 0 |

In the event some wrong information gets into the decoder matrix such that all of the five output gates retain an output of logical 1, then the output of nor gate 204 drops to a logical 0, this signal is transmitted by conductor 213a and negator 214 to the A input of nand gate 102 to enable it. As previously described, when the display command switch flip-flop 94 is set, the B input of gate 102 rises. With both A and B inputs at 1, the output of gate 102 drops to zero providing a reset signal on conductor 34. Automatic reset now occurs as described above in connection with the first pulse group reset signal. There is no print or paper advance. Thus, if the output of all five decoder matrix output gates remain at logical 1, the zero output from gate 204 will initiate reset.

ALARM PRIORITY

Up to this point it has been assumed that the signal transmission is being received on the trouble input 11. Of the signals shown in the above table, only fire alarm and flow alarm are transmitted on the high priority input 10. Let it now be assumed that a transmission begins at alarm input 10. The flip-flop 15 will follow the input pulses. In response to the first closure of contact 10a, the flip-flop 15 is set which drops output 15$\overline{Q}$ to zero and sets alarm priority flip-flop 25. The flip-flop output 25$\overline{Q}$ drops to zero and nand gate 35 turns off to prevent passage of any further signals from the trouble priority channel. The inhibit gate 36 in the watchman channel which provides passage for watchman signals as long as neither the trouble priority flip-flop nor the alarm priority flip-flop has been set now also inhibits any signals being simultaneously transmitted on the watchman channel. The signal on conductor 24 also sets the automatic reset pulse generator flip-flop 23. The output signal from flip-flop 23 is transmitted through the negator 30 and capacitor 31 to nor gate 32. From this point automatic reset occurs in the same manner as described above. The coded pulses from flip-flop 15 are transmitted through nor gate 26 and are handled like the pulses from the trouble channel. The positive output on line 51 from flip-flop 25 is transmitted to the decoder matrix nand gate 52 as an indication that an alarm channel signal is being sent, and to enable nand gate 52 at input C.

One significant difference in the operation of the decoder when a message is being received on the alarm channel is that a print is required after each round. This is accomplished in that with an alarm signal the quiescent condition of the display time selector 41 is retained in which the output therefrom on line 53 is zero, and through negator 93 in the display command switch 87 the nand gate 86 receives a positive enable signal. The display command switch will accept the signal from the round timer 63 to trigger the command to print, paper advance, and reset rather than having to wait for the end-of-message as signaled by the display timer. Thus the transmission of an alarm signal which is normally three or four rounds, is printed out three or four times by the printer because display command switch 87 accepts the signal from the round timer at the end of each round. Printout is made approximately two seconds after each round of pulses have ceased because of the period of the round timer. Since the main reset is set in motion automatically just after the print and paper advance have occurred, the round counter never gets past the count of one even though the fire alarm transmission is four rounds.

A signal transmission on the low priority watchman input does not affect the quiescent setting of display time selector 41 and thus the system is ready to print at the end of each round as soon as the round timer times out.

The embodiments of the invention in which an exclusive property or right is claimed are defined as follows:

1. Decoder apparatus for use in an alarm printer system in which transmitters transmit coded messages that are utilized to make a printed record where a message may comprise one or more repetitive rounds of coded pulses and each individual round consists of successive groups of pulses, and where each group of pulses provides intelligence, respectively, to separate functions of the printer, the decoder apparatus comprising:
   selector means for receiving said coded message and selectively assigning each successive group of pulses of said message, respectively, for transmission to a separate one of said functions of said printer;
   round counting means sensing the end of each round of coded pulses and storing the number of rounds counted and providing an output indicative thereof;
   further counting means connected to said selector means for counting the number of pulses in a selected one of said assigned successive group of pulses and providing an additional output indicative of the number of pulses counted;
   and decoder matrix means for combining the output from said round counting means and said further counting means to generate a matrix output indicative of said combination, said matrix means output being connected to a further function of said printer.

2. Decoder apparatus according to claim 1, wherein said selector means includes:
   sequential switching means having an input circuit, a plurality of output circuits and control means including switch advancing means for connecting said input circuit sequentially from one to another of said plurality of output circuits in response to a signal to the control means;
   input means connected to receive said coded message and to apply the message to said input circuit;
   means sensing the end of each group of pulses and thereupon providing a signal to said control means at the end of each pulse group;
   and means connecting the plurality of output circuits of said switching means, respectively, to individual functions of said printer.

3. Decoder apparatus according to claim 1 in which, said round counting means includes a plurality of output circuits and in which each count is transmitted on a different one of said output circuits;
   said further counting means includes a plurality of output circuits and in which each count is transmitted on a different one of said output circuits;
   and said decoder matrix means has a plurality of input circuits connected selectively, to the output circuits of said round counting means and said further counting means, and has a plurality of logic gates for combining the output signal from said round counting means and said further counting means to generate a matrix output signal on one of a plurality of matrix output circuits, and further includes means for converting said matrix output signal into a number of pulses which are connected to said further function of said printer.

4. Decoder apparatus according to claim 2 in which the plurality of output circuits of said sequential switching means connect to separate print wheels in the printer and the output of said decoder matrix means is connected to further print wheels in said printer.

5. Decoder apparatus according to claim 2 wherein said sequential switching means comprises a solid state logic coincidence switch.

6. Decoder apparatus according to claim 2 wherein said round counting means and said further counting means are solid state ring counters.

7. Decoder apparatus according to claim 1 and further comprising:
   first input means to be connected to a source of first coded messages;
   second input means to be connected to a source of higher priority coded messages;
   and priority detector means having output terminals and including said first and second input means, said priority detector means passing either of said first coded messages or said higher priority messages to said output terminals except during simultaneous transmission when only the higher priority message is passed through said detector means to said selector means.

8. Decoder apparatus according to claim 7 wherein said priority detector means includes a normally conductive gate in series with said first input means which is operative to a nonconductive state upon the occurrence of a message at said second input means.

9. Decoder apparatus according to claim 4 in which:
   said selected one of said successive groups of pulses provides intelligence to the printer wheel identifying the type of transmitter;
   the signal generated by said decoder matrix means provides intelligence to the printer wheel identifying the condition of the transmitter; and
   the other of said successive groups of pulses provides intelligence to the printer wheels identifying transmitter location.

10. Decoder apparatus according to claim 1 wherein:
    said successive groups of pulses in a round of a message comprises a reset pulse group followed by a plurality of intelligence transmitting pulse groups;
    said selector means includes a plurality of output channels;
    said separate functions of the printer includes a plurality of print wheels;
    and wherein each of said intelligence transmitting pulse groups is transmitted on a separate one of said plurality of output channels to a separate one of said print wheels.

11. Decoder apparatus according to claim 1 wherein said decoder matrix includes:
    a plurality of input circuits connected to receive the output signals from said round counting means and said further counting means;
    means including a plurality of logic gates connected to combine the signals from said input circuits and generate an output signal indicative of said combinaation on one of a plurality of output terminals;
    coincidence switch means having a plurality of first inputs connected to said output terminals;
    other counter means providing an input sequentially to a plurality of coincidence switch means second inputs, cooperating, respectively, with said first inputs so that upon the coincidence of a signal on a first input with a cooperating second input said matrix output is generated and connected to said further function of said printer.

References Cited

UNITED STATES PATENTS

| | | | |
|---|---|---|---|
| 2,918,654 | 12/1959 | Hillyer | 340—163 |
| 3,312,965 | 4/1967 | Ward | 340—150 |
| 3,392,378 | 7/1968 | Perry | 340—150 |

THOMAS A. ROBINSON, Primary Examiner

U.S. Cl. X.R.

178—23; 340—346